United States Patent
Kim et al.

(10) Patent No.: US 11,501,089 B2
(45) Date of Patent: Nov. 15, 2022

(54) ELECTRONIC DEVICE AND METHOD FOR CONTROLLING THE ELECTRONIC DEVICE THEREOF BASED ON DETERMINING INTENT OF A USER SPEECH IN A FIRST LANGUAGE MACHINE TRANSLATED INTO A PREDEFINED SECOND LANGUAGE

(71) Applicant: Samsung Electronics Co., Ltd., Suwon-si (KR)

(72) Inventors: Jiwan Kim, Suwon-si (KR); Seungsoo Kang, Suwon-si (KR); Jongyoub Ryu, Suwon-si (KR); Soyoon Park, Suwon-si (KR); Sangha Kim, Suwon-si (KR); Hakjung Kim, Suwon-si (KR); Myungjin Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 16/838,447

(22) Filed: Apr. 2, 2020

(65) Prior Publication Data

US 2020/0387677 A1   Dec. 10, 2020

Related U.S. Application Data

(60) Provisional application No. 62/857,473, filed on Jun. 5, 2019.

(30) Foreign Application Priority Data

Oct. 7, 2019   (KR) .......................... 10-2019-0124049

(51) Int. Cl.
*G10L 15/00*   (2013.01)
*G06F 40/44*   (2020.01)
(Continued)

(52) U.S. Cl.
CPC .............. *G06F 40/58* (2020.01); *G06F 40/30* (2020.01); *G06F 40/47* (2020.01); *G06F 40/51* (2020.01)

(58) Field of Classification Search
CPC ..... G10L 15/22; G10L 15/063; G10L 15/005; G10L 15/18; G06F 40/58; G06F 3/167;
(Continued)

(56) References Cited

U.S. PATENT DOCUMENTS 7,835,911 B2    11/2010   Balchandran et al.
8,249,854 B2 *   8/2012   Nikitin .................... G06F 40/58
                                                        704/4

(Continued)

FOREIGN PATENT DOCUMENTS

JP    2001-117583 A    4/2001
KR    10-1134467 B1    4/2012
(Continued)

OTHER PUBLICATIONS

International Search Report dated Jul. 21, 2020, issued in International Application No. PCT/KR2020/004973.
(Continued)

*Primary Examiner* — Farzad Kazeminezhad
(74) *Attorney, Agent, or Firm* — Jefferson IP Law, LLP

(57) ABSTRACT

An electronic device and a method for controlling the electronic device thereof are provided. The electronic device includes a memory storing instructions, and a processor configured to control the electronic device by executing the instructions stored in the memory, and the processor is configured to, based on a user's speech being input, acquire a first sentence in a first language corresponding to the user's speech through a speech recognition model corresponding to a language of the user's speech, acquire a second sentence in a second language corresponding to the first sentence in
(Continued)

the first language through a machine translation model trained to translate a plurality of languages into the predefined second language, and acquire a control instruction of the electronic device corresponding to the acquired second sentence or acquire a response to the second sentence through a natural language understanding model trained based on the second language.

18 Claims, 16 Drawing Sheets

(51) Int. Cl.
*G10L 15/22* (2006.01)
*G06F 40/58* (2020.01)
*G06F 3/16* (2006.01)
*G10L 15/06* (2013.01)
*G06F 16/332* (2019.01)
*G06F 40/40* (2020.01)
*G10L 15/18* (2013.01)
*G06F 40/279* (2020.01)
*G06F 40/30* (2020.01)
*G06F 40/47* (2020.01)
*G06F 40/51* (2020.01)

(58) Field of Classification Search
CPC .... G06F 16/3329; G06F 40/40; G06F 40/279; G06F 40/44
See application file for complete search history.

(56) References Cited

U.S. PATENT DOCUMENTS

| | | |
|---|---|---|
| 10,770,065 B2 | 9/2020 | Kim et al. |
| 11,093,719 B2 | 8/2021 | Lee et al. |
| 11,232,788 B2 * | 1/2022 | Yavagal ................. G10L 17/08 |
| 2006/0217955 A1 * | 9/2006 | Nagao ..................... G06F 40/58 704/2 |
| 2008/0052077 A1 | 2/2008 | Bennett et al. |
| 2013/0073276 A1 | 3/2013 | Sarikaya et al. |
| 2015/0142704 A1 | 5/2015 | London |
| 2015/0199340 A1 * | 7/2015 | Kwon ..................... G06F 40/51 704/2 |
| 2017/0337186 A1 | 11/2017 | Zhang et al. |
| 2018/0174580 A1 | 6/2018 | Kim et al. |
| 2019/0114322 A1 | 4/2019 | Huang |
| 2019/0251174 A1 | 8/2019 | Lee et al. |
| 2021/0366472 A1 * | 11/2021 | Lee ......................... H04L 65/40 |

FOREIGN PATENT DOCUMENTS

| | | |
|---|---|---|
| KR | 10-1259418 B1 | 4/2013 |
| KR | 10-2015-0085145 A | 7/2015 |
| KR | 10-2016-0081244 A | 7/2016 |
| KR | 10-2017-0091934 A | 8/2017 |
| KR | 10-2018-0070970 A | 6/2018 |
| KR | 10-2019-0023334 A | 3/2019 |
| KR | 10-2019-0041147 A | 4/2019 |
| KR | 10-2019-0097629 A | 8/2019 |
| WO | WO-2020068858 A1 * | 4/2020 ............. G06F 40/42 |

OTHER PUBLICATIONS

Pham Quan et al., KIT's Multilingual Neural Machine Translation systems for IWSLT 2017, XP055889699, retrieved on Feb. 9, 2022.
European Search Report dated Feb. 17, 2022, issued in European Application No. 20819389.6.

* cited by examiner

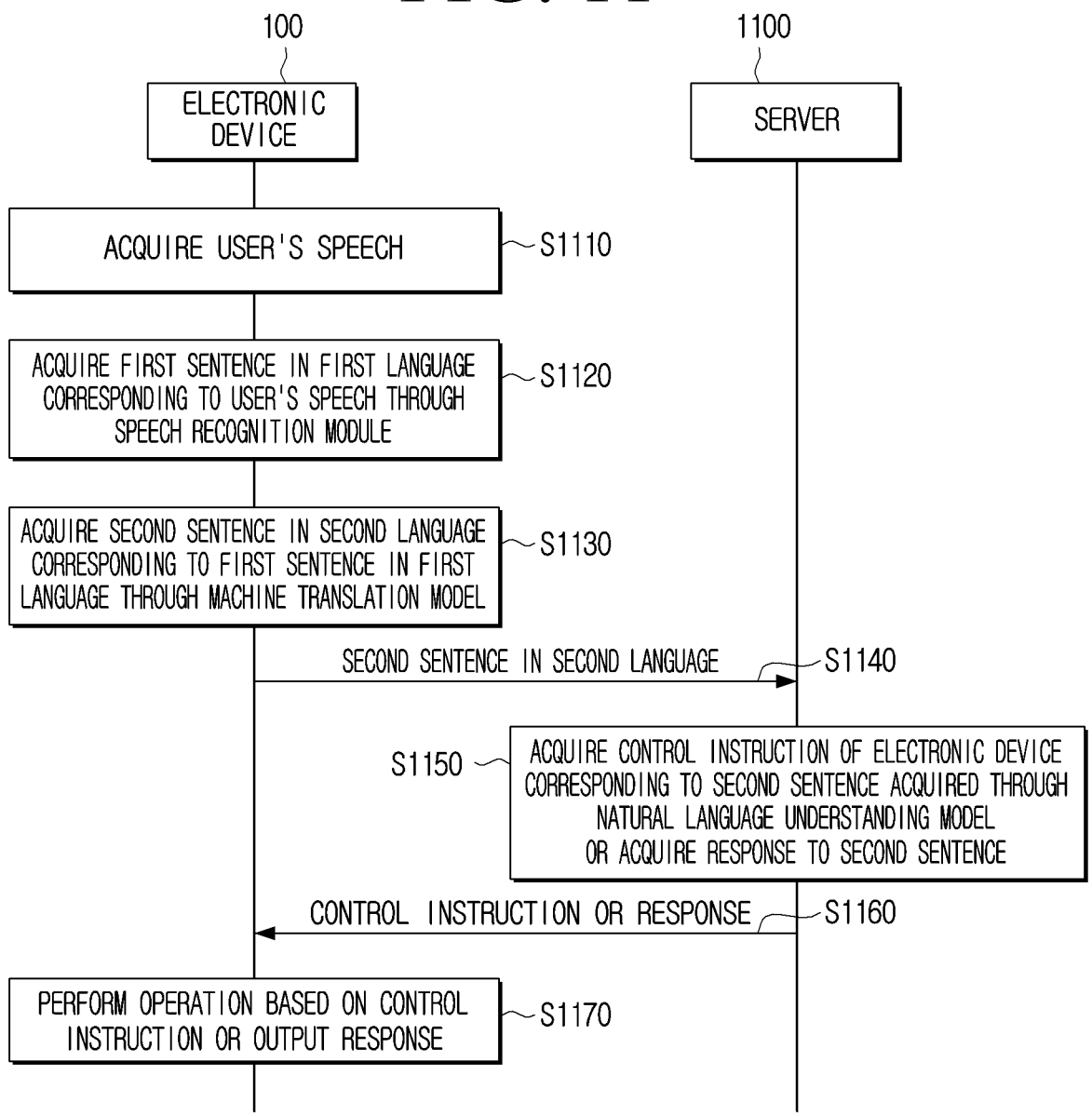

ELECTRONIC DEVICE AND METHOD FOR CONTROLLING THE ELECTRONIC DEVICE THEREOF BASED ON DETERMINING INTENT OF A USER SPEECH IN A FIRST LANGUAGE MACHINE TRANSLATED INTO A PREDEFINED SECOND LANGUAGE

CROSS-REFERENCE TO RELATED APPLICATION(S)

This application is based on and claims priority under 35 U.S.C. § 119(e) of a U.S. Provisional application Ser. No. 62/857,473, filed on Jun. 5, 2019, in the U.S. Patent and Trademark Office, and under 35 U.S.C. § 119(a) of a Korean patent application number 10-2019-0124049, filed on Oct. 7, 2019, in the Korean Intellectual Property Office, the disclosure of which is incorporated by reference herein in its entirety.

BACKGROUND

1. Field

The disclosure relates to an electronic device and a method for controlling the same. More particularly, the disclosure relates to an electronic device performing natural language understanding regarding a user's speech by using multilingual machine translation and a method for controlling the same.

2. Description of Related Art

In recent years, artificial intelligence systems are used in various fields. In particular, the artificial intelligence system is a system in which an electronic device trains, determines, and becomes smart, itself. As the artificial intelligence system is used, a recognition rate is improved and preferences of a user can be more accurately understood, and thus, the existing rule-based system is gradually being replaced with the deep learning-based artificial intelligence system.

In recent years, particularly, an artificial intelligence assistant system (or dialogue system) capable of providing a response to a user's speech or controlling an electronic device based on a user's speech by using the artificial intelligence system has been developed.

In such an artificial intelligence assistant system, it is necessary to provide a number of models used for natural language understanding by a number of supporting languages or it is necessary to perform training using a large amount of data as the number of supporting languages. For example, in a case of supporting two languages, two language models or data for two languages are necessary for natural language understanding. In order to generate language models used for natural language understanding, a large amount of learning data is needed by the number of supporting languages, and a lot of resources are needed, because it is necessary to provide a central processing unit (CPU) and a memory for executing the learning by using a large amount of learning data. In addition, as time passes, it may be necessary to additionally update a language model used for natural language understanding since new words or domains may be added or the existing word may be interpreted as a new meaning. That is, as a number or a size of the language models for natural language understanding increases, an amount of resources necessary for updating increases, thereby occurring a problem of increases in time and cost by the number of supporting languages.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for understanding received speech.

Additional aspects will be set forth in part in the description which follows and, in part, will be apparent from the description, or may be learned by practice of the presented embodiments.

In accordance with an aspect of the disclosure, an electronic device is provided. The electronic device includes a memory storing at least one instruction, and a processor, operatively coupled to the memory, and configured to control the electronic device by executing the at least one instruction stored in the memory, in which the processor is configured by the at least one instruction to, based on a user's speech being input, acquire a first sentence in a first language corresponding to the user's speech through a speech recognition model corresponding to a language of the user's speech, acquire a second sentence in a second language corresponding to the first sentence in the first language through a machine translation model trained to translate a plurality of languages into the second language, and acquire a control instruction of the electronic device corresponding to the acquired second sentence or acquire a response to the second sentence through a natural language understanding model trained based on the second language.

In accordance with another aspect of the disclosure, a method for controlling an electronic device is provided. The method includes based on a user's speech being input, acquiring a first sentence in a first language corresponding to the user's speech through a speech recognition model corresponding to a language of the user's speech, acquiring a second sentence in a second language corresponding to the first sentence in the first language through a machine translation model trained to translate a plurality of languages into the second language, and acquiring a control instruction of the electronic device corresponding to the acquired second sentence or acquiring a response to the second sentence through a natural language understanding model trained based on the second language.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a sequence diagram showing an embodiment of acquiring a control instruction regarding a user's speech in association with an external server according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
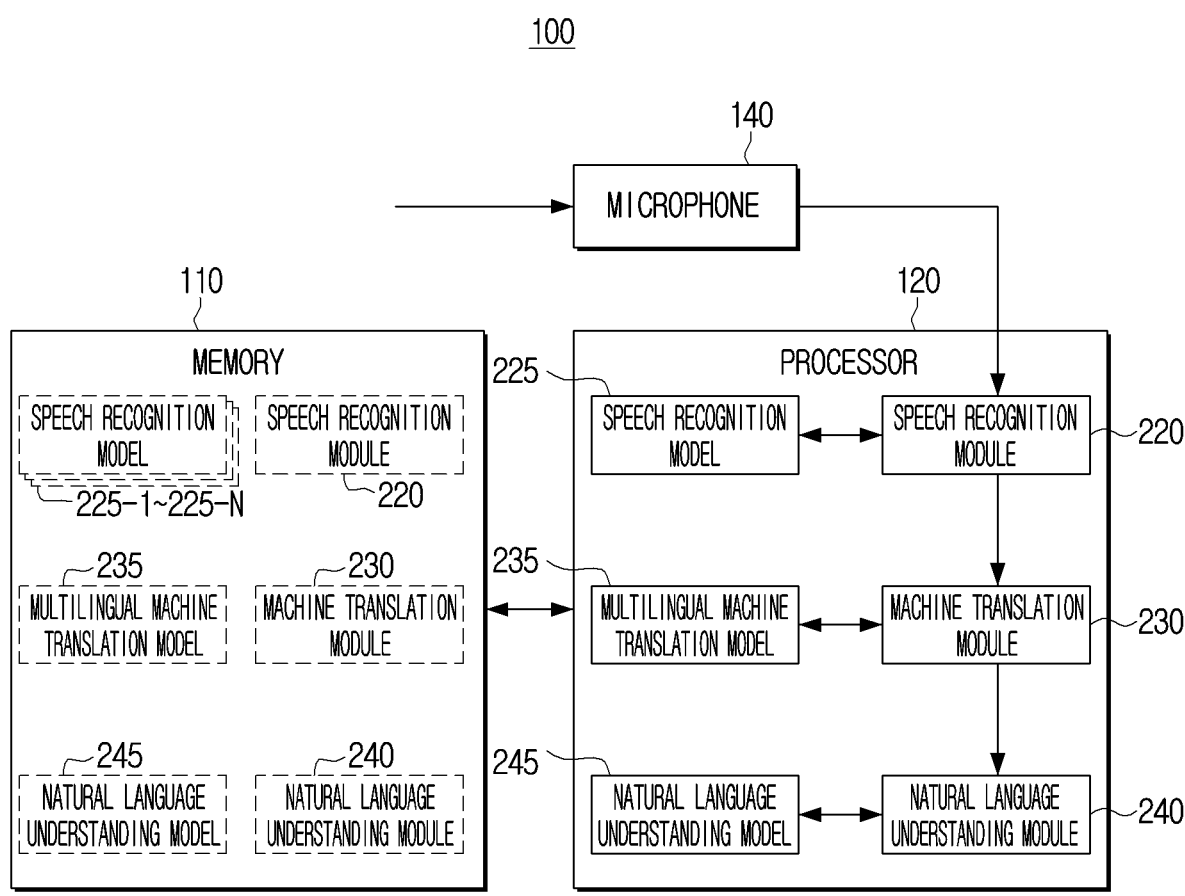
FIG. 1 is a view for describing a method for acquiring a control instruction or acquiring a response corresponding to a user's speech through multilingual machine translation by an electronic device according to an embodiment of the disclosure.

FIG. 1 is a view for describing a method for acquiring a control instruction or acquiring a response corresponding to a user's speech through multilingual machine translation by an electronic device 100 according to an embodiment of the disclosure.

The electronic device 100 according to an embodiment of the disclosure may be implemented as one of a smartphone, a tablet PD, a mobile phone, a video phone, an e-book reader, a desktop personal computer (PC), a laptop PC, a netbook computer, a workstation, a server, a public display of affection (PDA), a portable multimedia player (PMP), a moving picture experts group phase 1 or phase 2 (MPEG-1 or MPEG-2) audio layer-3 (MP3) player, medical device, a camera, a home appliance (e.g., a television (TV) or a refrigerator), or a wearable device.

In particular, the electronic device 100 may include a dialogue system for providing a response to a user's speech or controlling the electronic device 100 by performing speech recognition or natural language understanding regarding the user's speech.

Referring to FIG. 1, the dialogue system may include a speech recognition module 220, a speech recognition model 225, a machine translation module 230, a multilingual machine translation model 235, a natural language understanding module 240, and a natural language understanding model 245.

When the dialogue system is executed by a user's speech containing a wake-up word (or trigger word), the speech recognition module 220, the machine translation module 230, and the natural language understanding module 240 stored in the memory 110 (e.g., non-volatile memory) may be loaded to a memory (e.g., volatile memory) included in the processor 120. The speech recognition module 220, the machine translation module 230, and the natural language understanding module 240 may be loaded at the same time, but this is merely an embodiment, and these may be loaded in sequence.

The speech recognition module 220, the machine translation module 230, and the natural language understanding module 240 may respectively load the speech recognition model 225, the multilingual machine translation model 235, and the natural language understanding model 245 stored in the memory 110 (e.g., non-volatile memory) to the memory (e.g., volatile memory) included in the processor 120. The speech recognition model 225, the multilingual machine translation model 235, and the natural language understanding model 245 may be loaded in sequence by the speech recognition module 220, the machine translation module 230, and the natural language understanding module 240, but this is merely an embodiment, and these may be loaded to the volatile memory at the same time by a wake-up word.

A microphone 140 may receive a user's speech. The user's speech input to the electronic device 100 may be in a first language (for example, Korean). The user's speech input through the microphone 140 may be an audio signal of an analog type in a speech data form. The user's speech input to the microphone 140 may be in the first language (for example, Korean). The microphone 140 may process the user's speech into a digital form and output the user's speech to the speech recognition module 220 in the processor 120. The electronic device 100 may receive the user's speech through the microphone 140 provided in the electronic device 100 or connected to the electronic device 100 in a wired or wireless manner, but this is merely an embodiment, and electronic device 100 may receive the user's speech from an external device.

The speech recognition module 220 may acquire a first sentence in the first language in a text data form corresponding to the user's speech in a speech data form by performing speech recognition regarding the input user's speech by using the speech recognition model 225.

Specifically, the speech recognition module 220 may remove a noise from the user's speech in a digital form, extract a user's speech section, and input information regarding the extracted user's speech section to the speech recognition model 225. The speech recognition model 225 may acquire the first sentence in the first language in a text data form corresponding to the user's speech. The speech recognition model 225 may consist of an acoustic model and a language model. In particular, according to an embodiment of the disclosure, in order to recognize many languages, a plurality of speech recognition models 225-1 to 225-N corresponding to a plurality of languages may be stored in the memory 110 and the language model and the acoustic model may be provided in each of the speech recognition models. Particularly, the speech recognition module 220 may identify (or, determine) a language of the user's speech among a plurality of languages, and acquire the first sentence in the first language corresponding to the user's speech by inputting the user's speech to the language model and the acoustic model corresponding to the language of the user's speech. The first sentence may include at least one text and may include all of a word, a phrase, a clause with meanings. The feature that the speech recognition module 220 identifies the language of the user's speech will be described in detail with reference to FIG. 2.

The speech recognition module 220 may output the first sentence in the first language acquired through the speech recognition model 225 to the machine translation module 230. The machine translation module 230 may output the first sentence in the first language to the multilingual machine translation model 235, in order to translate the user's speech into a second language (e.g., English).

The multilingual machine translation model 235 may acquire a second sentence in the second language by performing multilingual machine translation 20 regarding the first sentence in the first language. The multilingual machine translation model 235 may be a multilingual neural translation model which translates a plurality of languages into one predefined language (second language, herein). The multilingual neural translation model may be a neural translation model trained in a multi-task learning method. This will be described later in detail with reference to FIG. 3A.

That is, the multilingual machine translation model 235 may acquire the second sentence in the second language by translating a sentence in any language into the predefined second language. The multilingual machine translation model 235 may acquire a sentence containing only the second language, but this is merely an embodiment, and the multilingual machine translation model 235 may acquire a sentence containing the second language and other languages.

In addition, the multilingual machine translation model 235 may acquire at least one candidate sentence in the second language and a reliability value of each of the at least one candidate sentence and output these to the machine translation module 230. The reliability value of the candidate sentence may be a value indicating a translation accuracy of the candidate sentence. The machine translation module 230 may output a candidate sentence having a highest reliability value among a plurality of candidate sentences as the second sentence.

Figure 3A:
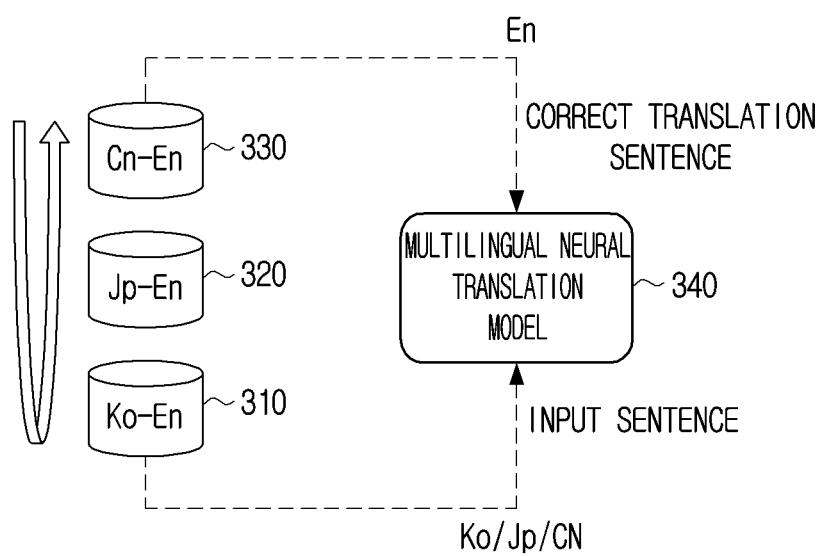
FIG. 3A is a view for describing a method for training a machine translation model according to an embodiment of the disclosure.

In addition, the multilingual machine translation model 235 may be implemented as multilingual neural translation model 340 shown in FIG. 3A, and may correct a part of text included in the second sentence in the second language through a beam search decoder 360 and a constrain DB 370.

The machine translation module 230 may output the second sentence in the second language output from the multilingual machine translation model 235 to the natural language understanding module 240, and the natural language understanding module 240 may output the second sentence in the second language to the natural language understanding model 245.

The natural language understanding model 245 may be a natural language understanding model trained based on the second language, and may acquire user's intent corresponding to the user's speech and a slot (or entity or parameter) necessary for performing an operation corresponding to the user's intent. The slot is main data of an electronic device for performing an operation corresponding to the user's intent and may vary depending on the operation or application executed. For example, if the user's intent is to alarm, the slot may be a type of an alarm application or alarm time information, and if the user's intent is to search, the slot may include a type of a search application or search terms.

The natural language understanding model 245 may be trained based on texts in the second language for performing functions or services provided by the electronic device 100. For example, the natural language understanding model 245 may grasp the user's intent by selecting one candidate sentence based on functions or services provided by the electronic device 100 among the plurality of candidate sentences in the second language output by the multilingual machine translation model 235. At this time, the multilingual machine translation model 235 may be retrained based on a result determined by the natural language understanding model 245.

Figure 4:
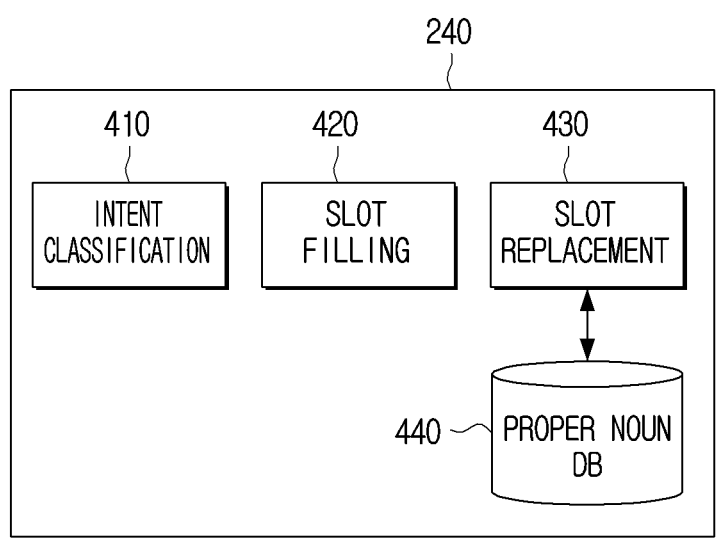
FIG. 4 is a block diagram showing components of a natural language understanding module according to an embodiment of the disclosure.

The natural language understanding model 245 may output the acquired user's intent in the user's speech and information regarding the slot to the natural language understanding module 240. The natural language understanding module 240 may acquire or correct the user's intent and the information regarding the slot by using an intent classification 410, a slot filling 420, a slot replacement 430, and a proper noun DB 440 as shown in FIG. 4.

The processor 120 may acquire a control instruction corresponding to the user's speech (that is, second sentence)

or acquire a response to the user's speech (that is, second sentence) based on the user's intent and the slot information acquired by the natural language understanding module 240 by the method described above.

As described above, the electronic device 100 is able to store a natural language understanding model with a lighter weight, by translating any language into a predefined second language through the multilingual machine translation model 235 that is able to translate many languages into one predetermined language. In addition, it is also possible to reduce an amount of resources necessary for updating the natural language understanding model and an updating period of time in the future.

In the embodiment described above, the electronic device may include the speech recognition module 220, the machine translation module 230, and the natural language understanding module 240, but this is merely an embodiment, and a feature of performing at least one of the speech recognition, the multilingual machine translation, and the natural language understanding may be performed in an external server. This will be described later in detail with reference to the drawings.

In the embodiment described above, it is described that the first sentence in the first language is acquired by performing the speech recognition with respect to the acquired user's speech, but this is merely an embodiment, and the first sentence in the first language may be acquired by using other methods. For example, when an image including a text is input, the electronic device 100 may acquire the first sentence in the first language included in the image by performing character recognition (e.g., optical character reader (OCR) analysis) regarding the image or inputting the image to a trained artificial intelligence model, perform the machine translation of the acquired first sentence in the first language into the second sentence in the second language, and perform the natural language understanding by using the second sentence in the second language. In another example, when a text of the first sentence in the first language according to a user's manipulation is input while a text input user interface (UI) is displayed, the electronic device 100 may perform the machine translation of the acquired first sentence in the first language into the second sentence in the second language and perform the natural language understanding by using the second sentence in the second language.

In FIG. 1, it is described that the speech recognition model 225, the multilingual machine translation model 235, and the natural language understanding model 245 are separated from the speech recognition module 220, the machine translation module 230, and the natural language understanding module 240, but this is merely an embodiment, and the speech recognition model 225, the multilingual machine translation model 235, and the natural language understanding model 245 may be included in the speech recognition module 220, the machine translation module 230, and the natural language understanding module 240.

Figure 2:
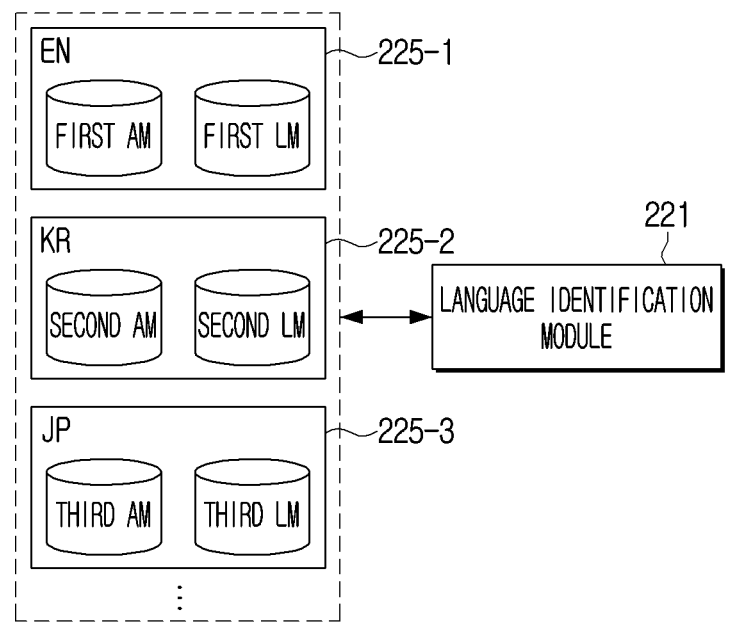
FIG. 2 is a block diagram showing components of a speech recognition module according to an embodiment of the disclosure.

FIG. 2 is a block diagram showing components of the speech recognition module according to an embodiment of the disclosure.

In particular, the speech recognition module according to an embodiment of the disclosure may include a language identification module 221 for identifying the machine translation model 235 corresponding to the language of the user's speech among a plurality of languages. The memory 110 may include the speech recognition models 225 corresponding to the plurality of languages.

Referring to FIG. 2, the memory 110 may store a first speech recognition model 225-1 including a first acoustic model (AM) and a first language model (LM) corresponding to English, a second speech recognition model 225-2 including a second AM and a second LM corresponding to Korean, a third speech recognition model 225-3 including a third AM and a third LM corresponding to Japanese, and the like.

In an example, if a user's speech is input, the language identification module 221 may identify a language type of the user's speech based on user setting. Specifically, if the language of the electronic device is set as Korean, the language identification module 221 may identify the language of the user's speech as Korean. In another example, if a user's speech is input, the language identification module 221 may identify the language type of the user's speech by analyzing phonetic alphabets of the input user's speech. In still another example, the language identification module 221 may identify the language type of the user's speech by inputting the user's speech to a neural model trained to identify the language.

When the language type of the user's speech is identified, the speech recognition module 220 may perform the speech recognition by using the second speech recognition model 225-2 corresponding to Korean identified by the language identification module 221. The speech recognition module 220 may load only the speech recognition model corresponding to the language of the user's speech among the plurality of speech recognition models.

In the embodiment described above, it is described that the plurality of speech recognition models are stored in the memory 110, but this is merely an embodiment, and the plurality of speech recognition models may be stored in an external server. When the language of the user's speech is identified by the language identification module 221, the processor 120 may transmit information regarding the user's speech and a signal requesting for the speech recognition model corresponding to the language of the user's speech to an external server via a communication interface 130, and receive the speech recognition model corresponding to the language of the user's speech from an external server.

FIG. 3A is a view for describing a method for training the multilingual machine translation model according to an embodiment of the disclosure. The multilingual machine translation model 235 according to an embodiment of the disclosure may include the multilingual neural translation model 340.

The multilingual neural translation model 340 may be a neural model constructed by performing multi-task learning based on a plurality of parallel corpora in which each of a plurality of languages and the predefined language are matched.

Referring to FIG. 3A, the multilingual neural translation model 340 may be trained by the multi-task learning method based on a first parallel corpus 310 storing Korean-English as a pair, a second parallel corpus 320 storing Japanese-English as a pair, and a third parallel corpus 330 storing Chinese-English as a pair. The multi-task learning is a method for performing training with a plurality of tasks at the same time to improve prediction performance and the task herein may indicate the parallel corpus. The multi-task learning is for maximizing performance in terms of generalization while ensuring performance of the model itself with respect to data collected from various tasks, and accordingly, both global performance of the model and local performance related to the task may be considered. Particularly, the multilingual neural translation model 340 may include an individual parameter corresponding to a language to be translated and a common parameter corresponding to a predefined translation target language and may learn the individual parameter and the common parameter by receiving the first to third parallel corpora 310 to 330.

In FIG. 3A, it is described that the multilingual neural translation model 340 performs the multi-task based on the plurality of parallel corpora in which each of the plurality of languages and the predefined language are matched, but this is merely an embodiment, and the multilingual neural translation model 340 may be trained by using parallel corpora in which a plurality of languages are matched with each other. For example, the multilingual neural translation model may be trained by using parallel corpora in Korean-English, English-Japanese, Japanese-Korean formats.

As shown in FIG. 3A, when the multilingual neural translation model 340 trained through the multi-task learning receives input sentences in Korean/Japanese/Chinese, the multilingual neural translation model 340 may output an output sentence in English. That is, if the first sentence is in Korean and the second sentence is in English, the multilingual neural translation model 340 may acquire the second sentence in English by translating the first sentence in Korean.

In addition, the multilingual neural translation model 340 may acquire a plurality of candidate sentences in the second language and a reliability value of each of the candidate sentences by translating the first sentence in the first language. The multilingual neural translation model 340 may output the plurality of candidate sentences and the reliability value of each of the plurality of candidate sentences to the natural language understanding module 240 through the machine translation module 230, but this is merely an embodiment, and the multilingual neural translation model 340 may output the second sentence and a reliability value of the second sentence to the natural language understanding module 240 by determining a candidate sentence having the highest reliability value as the second sentence.

Figure 3B:
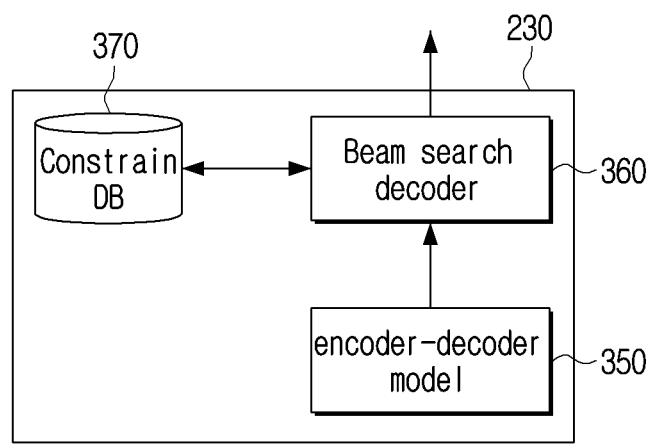
FIG. 3B is a block diagram showing components of a machine translation module according to an embodiment of the disclosure.

FIG. 3B is a block diagram showing components of the machine translation module according to an embodiment of the disclosure.

The machine translation module 230 may translate a specific text in the first language into a text mapped to the specific text by using the constrain database (constrain DB) (or first database) 370 storing input texts and correction texts of the multilingual machine translation model by mapping these.

Referring to FIG. 3B, the machine translation module 230 may include an encoder-decoder model 350 and a beam search decoder 360. The encoder-decoder model 350 is a machine translation model for translating the input first sentence in the first language and may acquire the second sentence in the second language corresponding to the first sentence in the first language. The beam search decoder 360 may make a correction by determining whether or not the second sentence in the second language includes the text stored in the constrain DB 370. For example, the first sentence in the first language, "문자 어플리케이션 켜줘" may be translated into the second sentence in the second language "Turn on text application" by the encoder-decoder model 350. If "text application" and "message application" are mapped to each other and stored in the constrain DB 370 as the input text and the correction text, the beam search decoder 360 may correct the second sentence in the second language as "Turn on message application".

In the embodiment described above, it is described that both the input text and the correction text of the beam search decoder 360 are in English, but this is merely an embodiment, and the input text and the correction text of the beam search decoder 360 may be in different languages. According to another embodiment, the beam search decoder 360 may be included in the encoder-decoder model 350 and translate the input text in the first language directly into the correction text in the second language. Specifically, the input text and the correction text mapped to each other and stored in the constrain DB 370 may be in languages different from each other. For example, the input text and the correction text may be stored as "문자 어플리케이션" and "message application". The beam search decoder 360 may translate "문자 어플리케이션" in the first language directly into "message application" in the second language based on the input text and the correction text stored in the constrain DB 370.

At this time, the constrain DB 370 may be updated based on an output result of the natural language understanding module 240. Specifically, when some texts in the second sentence in the second language are replaced through the natural language understanding module 240, the constrain DB 370 may update the input text and the correction text based on a replaced result.

FIG. 4 is a block diagram showing components of the natural language understanding module 240 according to an embodiment of the disclosure.

Referring to FIG. 4, the natural language understanding module 240 may include an intent classification 410, a slot filling 420, and a slot replacement 430. At this time, at least one of the intent classification 410 and the slot filling 420 may be implemented as the natural language understanding model 245.

The intent classification 410 may classify (or determine, understand, analyze, recognize) the user's intent in the second sentence in the second language (or first-priority sentence among the plurality of candidate sentences in the second language). The intent classification 410 may classify the user's intent through syntactic analysis or semantic analysis. However, if the intent classification 410 is not able to classify the user's intent in the second sentence in the second language (that is, the first-priority sentence in the second language) (that is, if a reliability value regarding whether or not the classified user's intent in the second sentence in the second language is correct is lower than a threshold value, the intent classification 410 may classify the user's intent in the second-priority sentence in the second language. When the intent in the second-priority sentence is classified, the natural language understanding module 240 may map at least one text included in the first sentence and at least one text included in the second-priority sentence as the input text and the correction text and the constrain DB 370 may be updated. For example, if "Turn on message application" is acquired as the first-priority sentence in the second language and "Open message application" is acquired as the second-priority sentence with respect to the first sentence in the first language "문자 어플리케 이션을 켜줘", the intent classification 410 may not grasp the user's intent in the first-priority sentence and may identify (or, determine) "LAUNCH APP" as the user's intent in the second-priority sentence. Accordingly, the natural language understanding module 240 may update the constrain DB 370 to map the input text and the correction text respectively as "Turn on" and "Open" or "켜줘" and "Open" and store these as the texts related to the application.

The slot filling 420 may identify (or, determine) the slot regarding the function to be executed by a user by using a matching rule based on the user's intent. For example, with respect to the second sentence in the second language "Open message application", the slot filling 420 may identify (or, determine) "message app" as the slot.

The slot replacement 430 may replace the slot filled by the slot filling 420 with another slot. The slot filling 420 may identify (or, determine) whether or not there is a slot needed to be replaced by using the proper noun DB 440 (or second database). For example, if a name of an application is stored in the proper noun DB 440 in the first language, the slot replacement 430 may replace "message app" which is the identified (or, determined) slot with "메시지 어플리케이션". The proper noun DB 440 may not only store the name of the application, but also contact information, schedule information, and the like.

In addition, the natural language understanding module 240 may update the constrain DB 370 based on the replaced result by the slot replacement 430. For example, the natural language understanding module 240 may update the constrain DB 370 to map the input text and the correction text respectively as "문자 어플리케이션" and "message application" and store these.

Figure 5:
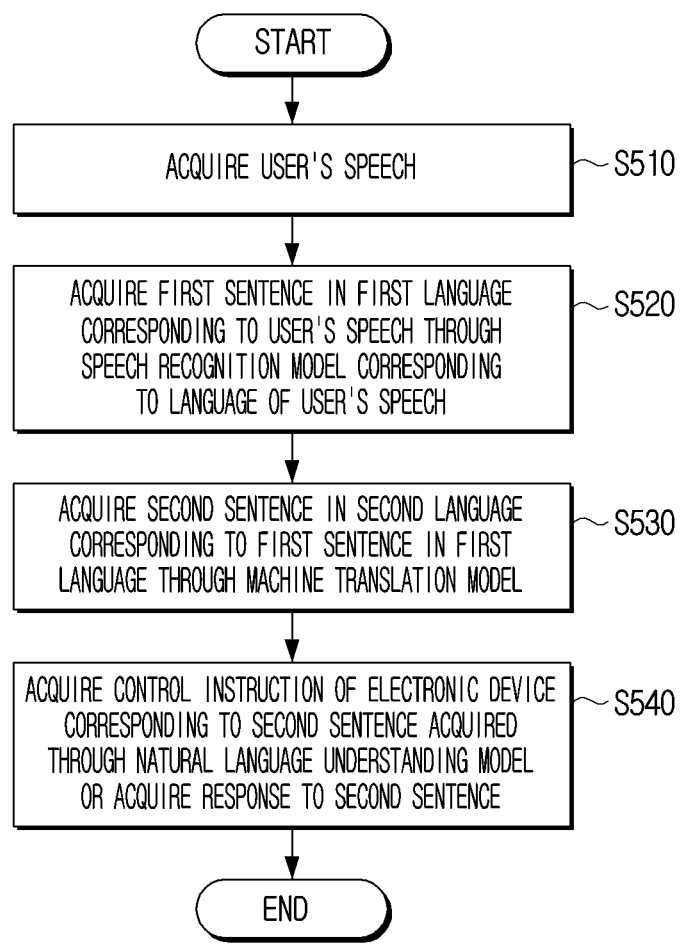
FIG. 5 is a flowchart for describing a method for controlling an electronic device acquiring a control instruction regarding a user's speech through multilingual machine translation according to an embodiment of the disclosure.

FIG. 5 is a flowchart for describing a method for controlling an electronic device acquiring a control instruction regarding a user's speech through multilingual machine translation according to an embodiment of the disclosure.

Referring to FIG. 5, the electronic device 100 may acquire the user's speech at operation S510. The user's speech may include the first sentence in the first language in a speech data form.

The electronic device 100 may acquire the first sentence in the first language corresponding to the user's speech through the speech recognition model corresponding to the language of the user's speech at operation S520. That is, as shown in FIG. 2, the electronic device 100 may identify the language of the user's speech and acquire the first sentence in the first language in a text data form through the speech recognition model corresponding to the identified user's speech.

The electronic device 100 may acquire the second sentence in the second language corresponding to the first sentence in the first language through the machine translation model at operation S530. The machine translation model may be the multilingual neural translation model 340 as described in FIG. 3A, and the multilingual neural translation model 340 may be trained to translate any language into the predefined second language.

The electronic device 100 may acquire a control instruction of the electronic device 100 corresponding to the second sentence acquired through the natural language understanding model 245 or acquire a response to the second sentence at operation S540. That is, the electronic device 100 may identify (or, determine) the user's intent and the slot corresponding to the second sentence through the natural language understanding model 245 and acquire a control instruction or a response based on the identified (or, determined) user's intent and the slot.

Figure 6:
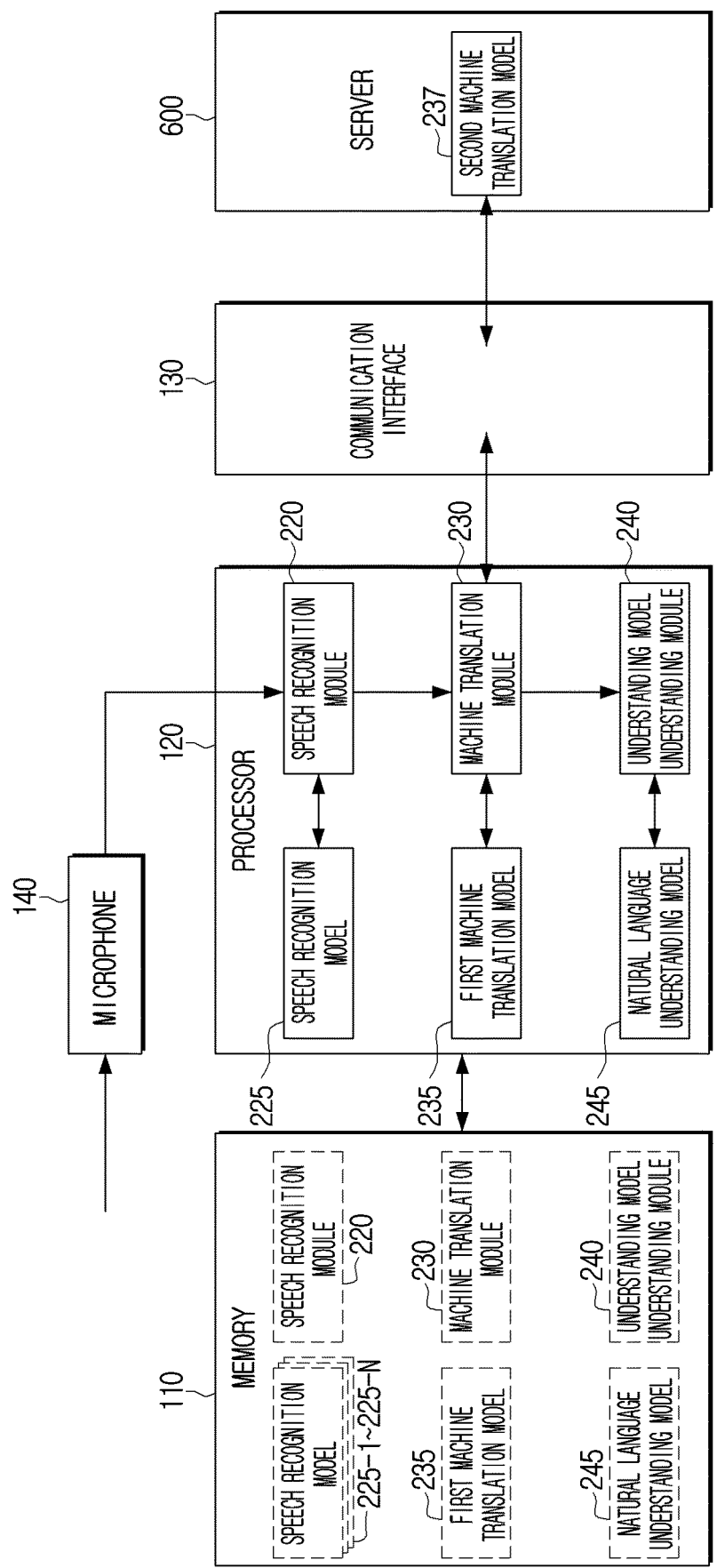
FIG. 6 is a view for describing a method for acquiring a control instruction or acquiring a response corresponding to a user's speech through multilingual machine translation by an electronic device according to an embodiment of the disclosure.

FIG. 6 is a view for describing a method for acquiring a control instruction or acquiring a response corresponding to the user's speech through the multilingual machine translation by the electronic device according to an embodiment of the disclosure.

Referring to FIG. 6, the description overlapped with the description of FIG. 1 will be omitted. In addition, a first machine translation model 235 shown in FIG. 6 may be the same module as the machine translation model 235 shown in FIG. 1.

When the first sentence in the first language is input to the first machine translation model 235, the first machine translation model 235 acquires the second sentence in the second language and a reliability value by translating the first sentence in the first language, and output the acquired second sentence in the second language and reliability value to the machine translation module 230. The first machine translation model 235 may acquire a sentence having a highest reliability value among a plurality of candidate sentences and acquire a reliability value of the sentence having the highest reliability value. The reliability value may be a value of an accuracy of the translation of the corresponding sentence. Meanwhile, this is merely an embodiment, and the first machine translation model 235 may transmit the plurality of candidate sentences and the reliability value of each of the plurality of candidate sentences to the machine translation module 230.

The machine translation module 230 may request an external server 600 for translation of the first sentence based on the reliability value. That is, if the reliability value of the sentence having the highest reliability value is lower than a threshold value, the machine translation module 230 may transmit the first sentence in the first language to the server 600 via the communication interface 130.

The server 600 may translate the first sentence in the first language into a third sentence in the second language through a second machine translation model 237 and transmit the third sentence to the machine translation module 230 of the electronic device 100 through the communication interface 130. The second machine translation model 237 is a translation model trained with a larger amount of data (e.g., corpora) than the first machine translation model 235, and may have higher accuracy than the first machine translation model 235.

The machine translation module 230 may output the third sentence in the second language received from the server 600 to the natural language understanding module 240. The machine translation module 230 may output the third sentence in the second language to the natural language understanding module 240 and execute updating (or retraining) of the first machine translation model 235 based on the third sentence in the second language.

The natural language understanding module 240 may output the third sentence in the second language to the natural language understanding model 245.

The natural language understanding model 245 may acquire the user's intent in the user's speech and the information regarding the slot by executing the natural language understanding based on the third sentence in the second language, and output the acquired user's intent in the user's speech and information regarding slot to the natural language understanding module 240.

The processor 120 may provide a response to the user's speech or control the electronic device 100 based on the user's intent and the slot information acquired by the natural language understanding module 240 by the method described above. In particular, as shown in FIG. 6, it is possible to provide a response providing service or machine control service to a user through more accurate translation and improve performance of the first machine translation model 235 by requesting the server 600 for machine translation based on the reliability value output by the first machine translation model 235.

Figure 7A:
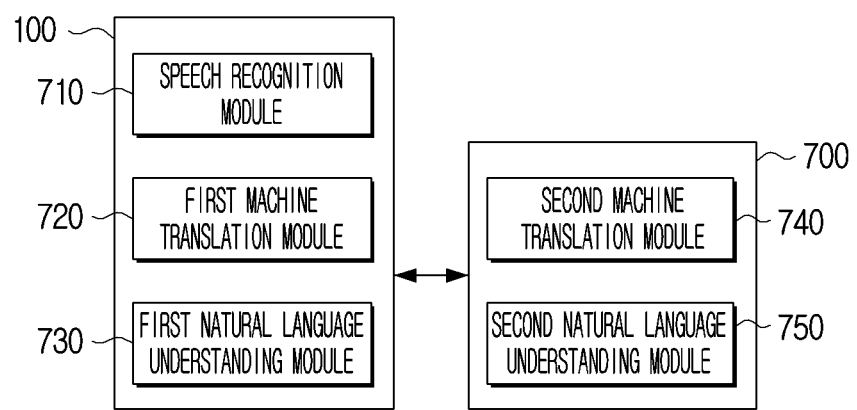
FIG. 7A is a view for describing an embodiment of performing natural language understanding regarding a user's speech in association with an external server according to an embodiment of the disclosure.

FIG. 7A is a view for describing an embodiment in which natural language understanding regarding a user's speech is performed in association with an external server according to an embodiment of the disclosure.

Referring to FIG. 7A, the electronic device 100 may include a speech recognition module 710, a first machine translation module 720, and a first natural language understanding module 730, and a server 700 may include a second machine translation module 740 and a second natural language understanding module 750. The first machine translation module 720 and the second machine translation module 740 may respectively include a first machine translation model and a second machine translation model that are able to translate any language into a predefined second language. The second machine translation model is a machine translation model trained by using a larger amount of corpora than the first machine translation model, and may perform more accurate machine translation than the first machine translation model. In addition, the first natural language understanding module 730 and the second natural language understanding module 750 may respectively include a first natural language understanding model and a second natural language understanding model for acquiring user's intents and slots by performing the natural language understanding regarding the user's speech. The first natural language understanding model may understand a natural language in a domain corresponding to a function and a service provided by the electronic device 100, but the second natural language understanding model may understand a natural language in a wider domain without any limit to the function and service provided by the electronic device 100.

Particularly, the electronic device 100 may perform the natural language understanding regarding the user's speech in association with the server 700 based on the reliability value of the second sentence in the second language acquired from the first machine translation module 720.

Hereinafter, an embodiment of performing the machine translation or natural language understanding through the server based on the reliability value regarding the machine translation will be described with reference to FIG. 7B and FIG. 7C.

Figure 7B:
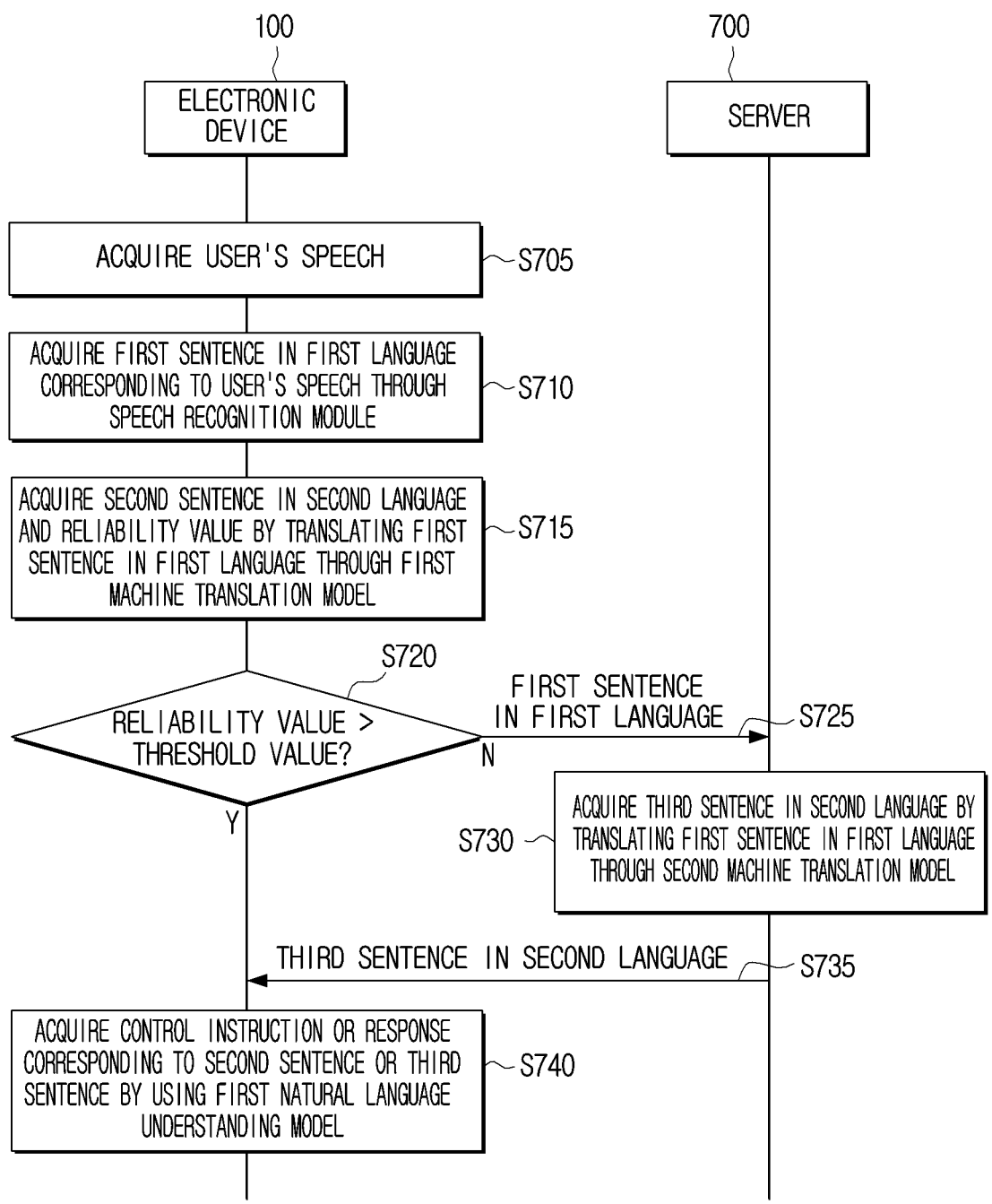
FIG. 7B is a sequence diagram showing an embodiment of performing machine translation through a server based on a reliability value regarding machine translation according to an embodiment of the disclosure.

FIG. 7B is a sequence diagram for describing an embodiment of performing machine translation by the server 700, when the reliability value is low, according to an embodiment of the disclosure.

Referring to FIG. 7B, first, the electronic device 100 may acquire the user's speech at operation S705. The input user's speech is in a speech data form and may include at least one text.

The electronic device 100 may acquire the first sentence in the first language corresponding to the user's speech through the speech recognition module at operation S710. That is, the electronic device 100 may acquire the first sentence in the second language in a text data form through the speech recognition module.

The electronic device 100 may acquire the second sentence in the second language and the reliability value thereof by translating the first sentence in the first language through the first machine translation model at operation S715. The electronic device 100 may acquire the first-priority sentence having the highest reliability value as the second sentence, among the plurality of candidate sentences in the second language acquired by translating the first sentence in the first language through the first machine translation model.

The electronic device 100 may identify (or, determine) whether or not the acquired reliability value is higher than a threshold value at operation S720. The threshold value herein indicates a reliable value of the first-priority sentence as the user's speech and may be, for example, 0.95.

If the reliability value is higher than the threshold value at operation S720-Y, the electronic device 100 may acquire a control instruction corresponding to the second sentence or a response to the second sentence by using the first natural language understanding model at operation S740. That is, the electronic device 100 may identify (or, determine) the user's intent and the slot corresponding to the user's speech by inputting the second sentence in the second language to the first natural language understanding model, and acquire a control instruction or acquire a response based on the user's intent and the slot.

If the reliability value is equal to or lower than the threshold value at operation S720-N, the electronic device 100 may transmit the first sentence in the first language to the external server 700 at operation S725. The electronic device 100 may transmit the first sentence in the first language in a text data form, but this is merely an embodiment, and the electronic device 100 may perform the transmission in a speech data form.

The server 700 may acquire the third sentence in the second language by translating the first sentence in the first language through the second machine translation model at operation S730. The server 700 may acquire the third sentence in the second language by translating the first sentence in the first language through the second machine translation model trained with a larger amount of data (e.g., corpora) than the first machine translation model. In addition, when the first sentence in the first language in a speech data form is received, the server 700 may acquire the first sentence in the first language in a text data form through the speech recognition module and translate the acquired sentence through the second machine translation model.

The server 700 may transmit the third sentence in the second language to the electronic device 100 at operation S735.

The electronic device 100 may acquire a control instruction corresponding to the third sentence or acquire a response to the third sentence by using the first natural language understanding model at operation S740. That is, the electronic device 100 may identify (or, determine) the user's intent and the slot corresponding to the user's speech by using the third sentence in the second language to the first natural language understanding model and acquire a control instruction or a response based on the user's intent and the slot. The electronic device 100 may retrain the multilingual neural translation model based on the first sentence in the first language and the third sentence in the second language acquired.

Figure 7C:
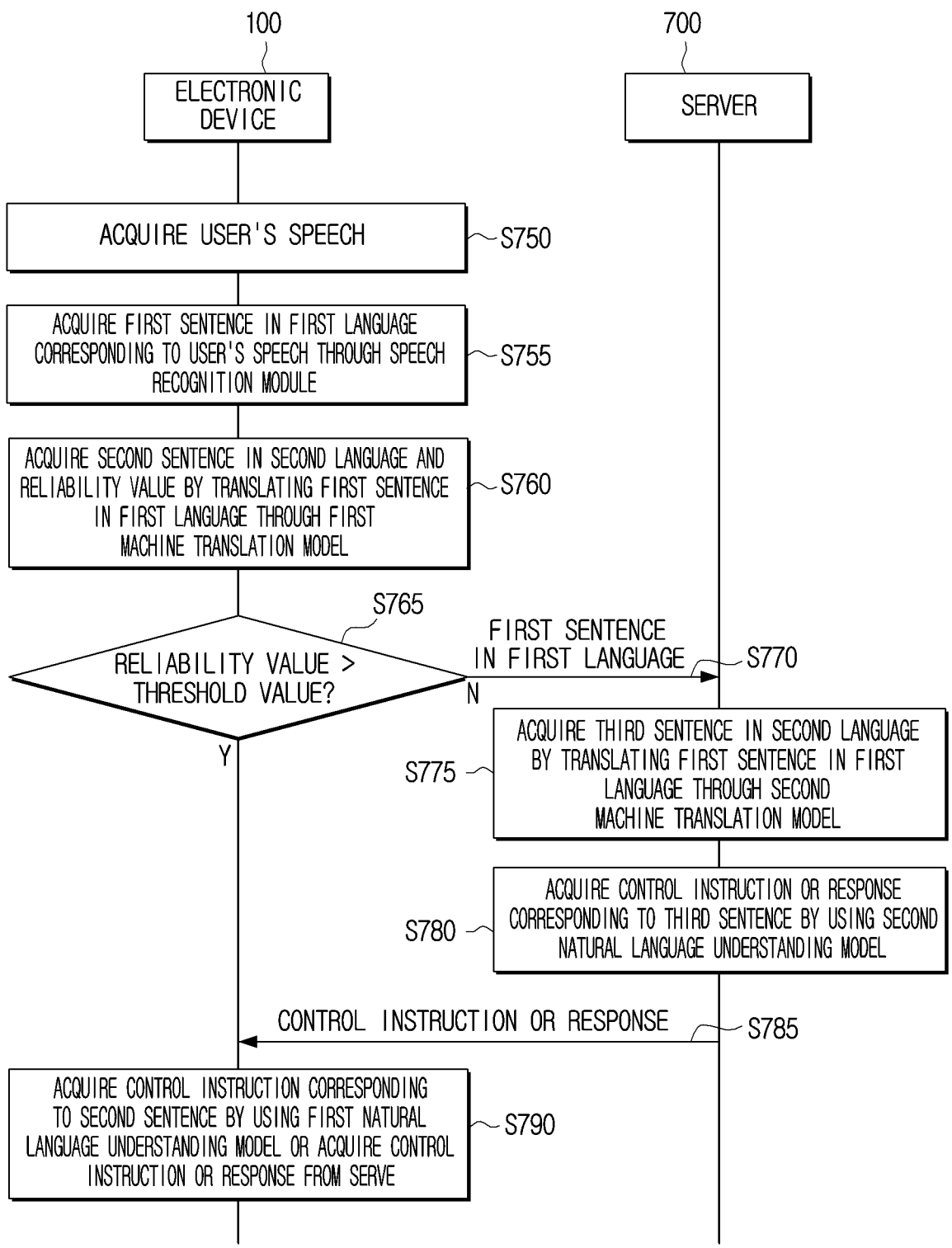
FIG. 7C is a sequence diagram showing an embodiment of performing machine translation and natural language understanding through a server based on a reliability value regarding machine translation according to an embodiment of the disclosure.

FIG. 7C is a sequence diagram for describing an embodiment of performing machine translation and natural language understanding by the server 700 based on a low reliability value according to an embodiment of the disclosure.

Referring to FIG. 7C, operations S750 to S775 according to an embodiment of the disclosure are identical to operations S705 to S730 shown in FIG. 7B and therefore the overlapped description will be omitted.

The server 700 may acquire a control instruction or a response corresponding to the third sentence in the second language acquired through the second machine translation model by using the second natural language understanding model at operation S780. Specifically, the server 700 may identify (or, determine) the user's intent and the slot corresponding to the third sentence through the second natural language understanding model and acquire an action rule as a control instruction or a response based on the identified (or, determined) user's intent and the slot. That is, the server 700 may acquire more accurate control instruction or response by performing the natural language understanding through the second natural language understanding model that is able to perform the natural language understanding regarding a larger domain.

The server 700 may transmit the control instruction or the response to the electronic device 100 at operation S785 and the electronic device 100 may acquire the control instruction or the response acquired from the server 700 at operation S790. The electronic device 100 may control the electronic device 100 based on the acquired control instruction or output the response.

Figure 8A:
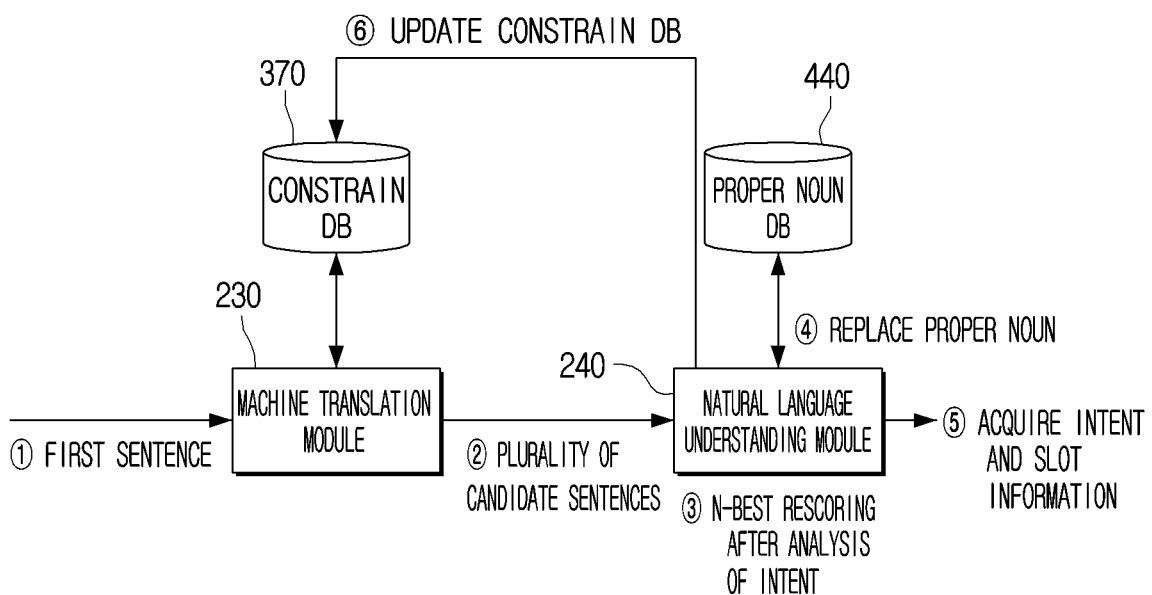
FIG. 8A is a view for describing a method for performing natural language understanding regarding a plurality of candidate sentences according to an embodiment of the disclosure.

FIG. 8A is a view for describing a method for performing natural language understanding regarding a plurality of candidate sentences according to an embodiment of the disclosure.

Referring to FIG. 8A, the electronic device 100 may acquire the first sentence in the first language (①in FIG. 8A). For example, the electronic device 100 may acquire the first sentence in Korean "문자 어플리케이션 켜줘".

The electronic device 100 may acquire a plurality of candidate sentences in the second language by using the machine translation module 230 (② FIG. 8A). The electronic device 100 may acquire a reliability value of each of the plurality of candidate sentences, in addition to the plurality of candidate sentences in the second language. For example, the electronic device 100 may acquire "turn on message application", "open message application", and "play message application" as the candidate sentences in the second language obtained by translating "문자 어플리케이션 켜줘" and acquire "0.98", "0.94", and "0.88" as reliability values, respectively.

The electronic device 100 may perform N-best rescoring after analyzing the intent in a first-priority sentence having the highest reliability value among the plurality of candidate sentences through the natural language understanding module 240 (③ in FIG. 8A). That is, the electronic device 100 may identify (or, determine) the user's intent in the first-priority sentence. When the user's intent in the first-priority sentence is identified (or, determined), the electronic device 100 may identify (or, determine) the slot based on the identified (or, determined) user's intent. If the user's intent in the first-priority sentence is not identified (or, determined), the electronic device 100 may identify (or, determine) the user's intent in a second-priority sentence having a reliability value lower than that of the first-priority sentence. The electronic device 100 may rescore the reliability value of the second-priority sentence.

For example, the electronic device 100 may analyze the user's intent in "turn on message application" through the natural language understanding module 240. At this time, the electronic device 100 may not analyze the user's intent in "turn on message application" and may analyze the user's intent in "open message application" which is the second-priority sentence. The electronic device 100 may identify (or, determine) the user's intent as "LAUNCH APP". Therefore, the electronic device 100 may rescore the reliability value of "open message application", and retrain the multilingual neural translation model included in the machine translation module 230 based on the rescored reliability value. The electronic device 100 may retrain the multilingual neural translation model based on alignment information of texts. That is, the electronic device 100 may retrain the multilingual neural translation model 340 to set the reliability value of "open" to be higher than that of "turn on", when executing the translation of "켜줘" in the sentence as an operation of the application. That is, in the electronic device 100, if the text regarding the application does not exist in the sentence, the reliability value of "open" may be higher than that of "turn on", when executing the translation of "켜줘".

The electronic device 100 may identify (or, determine) the slot for executing an action corresponding to the user's speech after determining the user's intent. The electronic device 100 may identify (or, determine) whether or not a proper noun stored in the proper noun DB 440 exists in the sentence, the intent in which is identified (or, determined), and replace the slot (□ in FIG. 8A). For example, the electronic device 100 may acquire "APP NAME: message application" as the slot for the user's intent "LAUNCH APP". When "문자 어플리케이션" is stored in the proper noun DB 440 in Korean, the electronic device 100 may replace the existing slot with "APP NAME: 문자 어플리케이션" based on the message application contained in the first language.

The electronic device 100 may acquire the intent and the slot information through the natural language understanding module 240 through the processes described above (□ in FIG. 8A). For example, the electronic device 100 may acquire "LAUNCH APP" as the user's intent and acquire "APP NAME: 문자 어플리케이션" as the slot. Therefore, the electronic device 100 may acquire the control instruction based on the user's intent and the slot information acquired. That is, the electronic device 100 may acquire the control instruction "execute message application" and execute the message application based on the acquired control instruction.

In addition, the electronic device 100 may update the constrain DB 370 based on information stored in the proper noun DB 440 after replacing the proper noun (□ in FIG. 8A). For example, the electronic device 100 may update the constrain DB 370 so that the machine translation module 230 does not translate "문자 어플리케이션" into "message application" but output as "문자 어플리케이션". That is, the constrain DB 370 may store by matching the input text and the correction text matched as "message application" and "문자 어플리케이션", respectively.

Figure 8B:
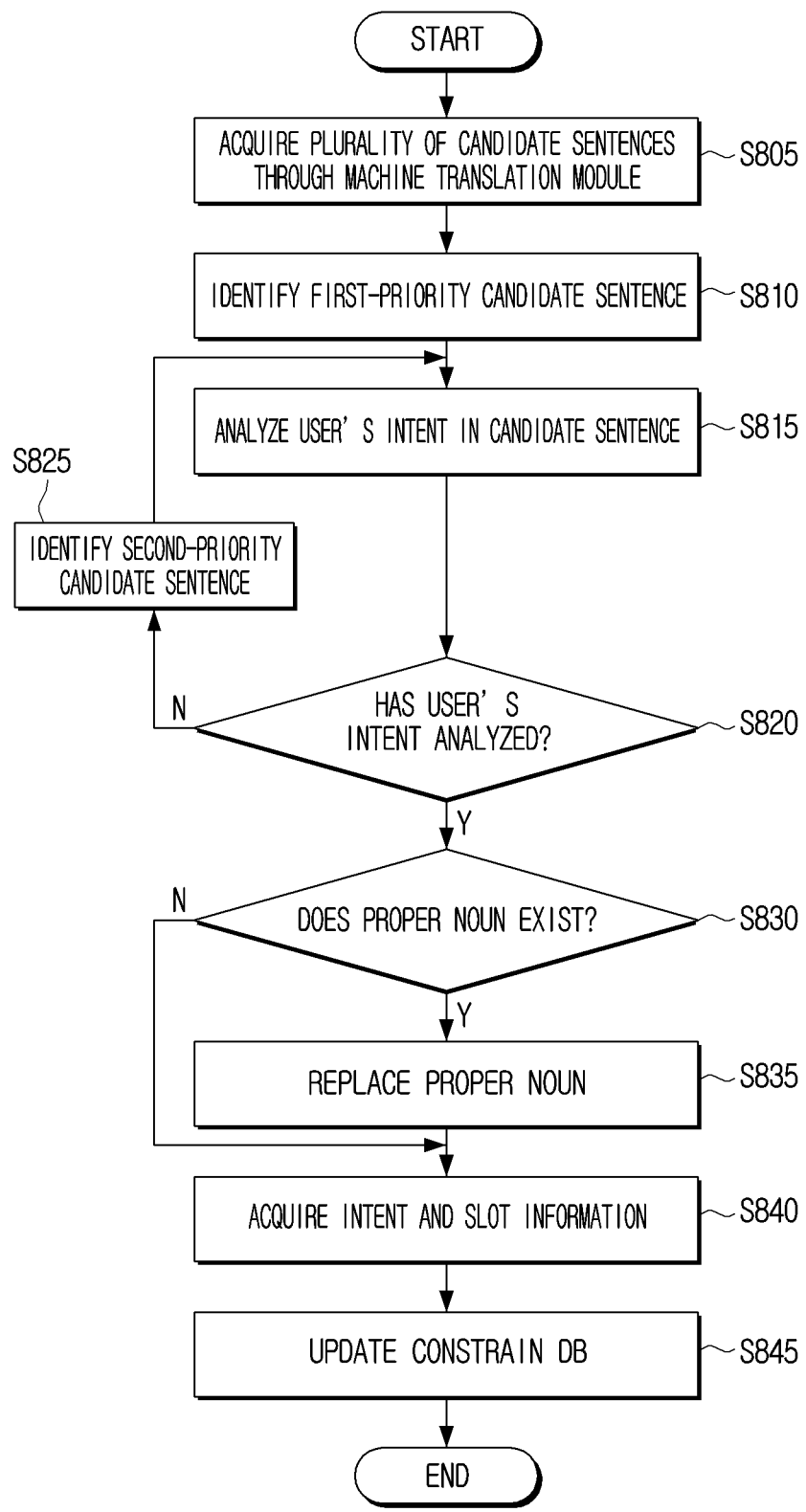
FIG. 8B is a flowchart for describing the method for performing natural language understanding regarding the plurality of candidate sentences according to an embodiment of the disclosure.

FIG. 8B is a flowchart for describing the method for performing natural language understanding regarding the plurality of candidate sentences according to an embodiment of the disclosure.

Referring to FIG. 8B, the electronic device 100 may acquire the plurality of candidate sentences through the machine translation module at operation S805. The electronic device 100 may acquire not only the plurality of candidate sentences, but also the reliability value of each of the plurality of candidate sentences.

The electronic device 100 may identify the first-priority candidate sentence at operation S810. The electronic device 100 may identify a sentence having the highest reliability value among the plurality of candidate sentences as the first-priority candidate sentence.

The electronic device 100 may analyze the user's intent in the candidate sentence at operation S815. That is, the electronic device 100 may analyze the user's intent in the first-priority candidate sentence by performing syntactic analysis or semantic analysis.

The electronic device 100 may identify (or, determine) whether or not the user's intent is analyzed at operation S820.

When the user's intent is not analyzed at operation S820-N, the electronic device 100 may identify a second-priority candidate sentence at operation S825. That is, the electronic device 100 may identify the second-priority candidate sentence having a reliability value lower than that of the first-priority candidate sentence.

The electronic device 100 may analyze the user's intent in the candidate sentence again at operation S815.

When the user's intent is analyzed through the processes described above at operation S820-Y, the electronic device 100 may identify (or, determine) whether or not the proper noun exists in the slot corresponding to the user's intent at operation S830. That is, the electronic device 100 may identify (or, determine) whether or not the proper noun stored in the proper noun DB 440 of the electronic device 100 exist in the slot corresponding to the user's intent.

When the proper noun does not exist at operation S835-N, the electronic device 100 may acquire the user's intent and the slot information at operation S840. However, when the proper noun exists at operation S835-Y, the electronic device 100 may replace the proper noun included in the slot based on the proper noun DB 440 and acquire the user's intent and the slot information based on the replaced slot.

The electronic device 100 may update the constrain DB 370 based on the replaced result of the proper noun at operation S845.

The electronic device 100 may store only limited proper nouns. That is, only the proper nouns related to the electronic device 100 (for example, application names, contact information, schedule information, and the like) may be stored, and general proper nouns (for example, place names, store names, and the like) may not be stored. Accordingly, the electronic device may replace the proper noun in association with an external server.

Figure 8C:
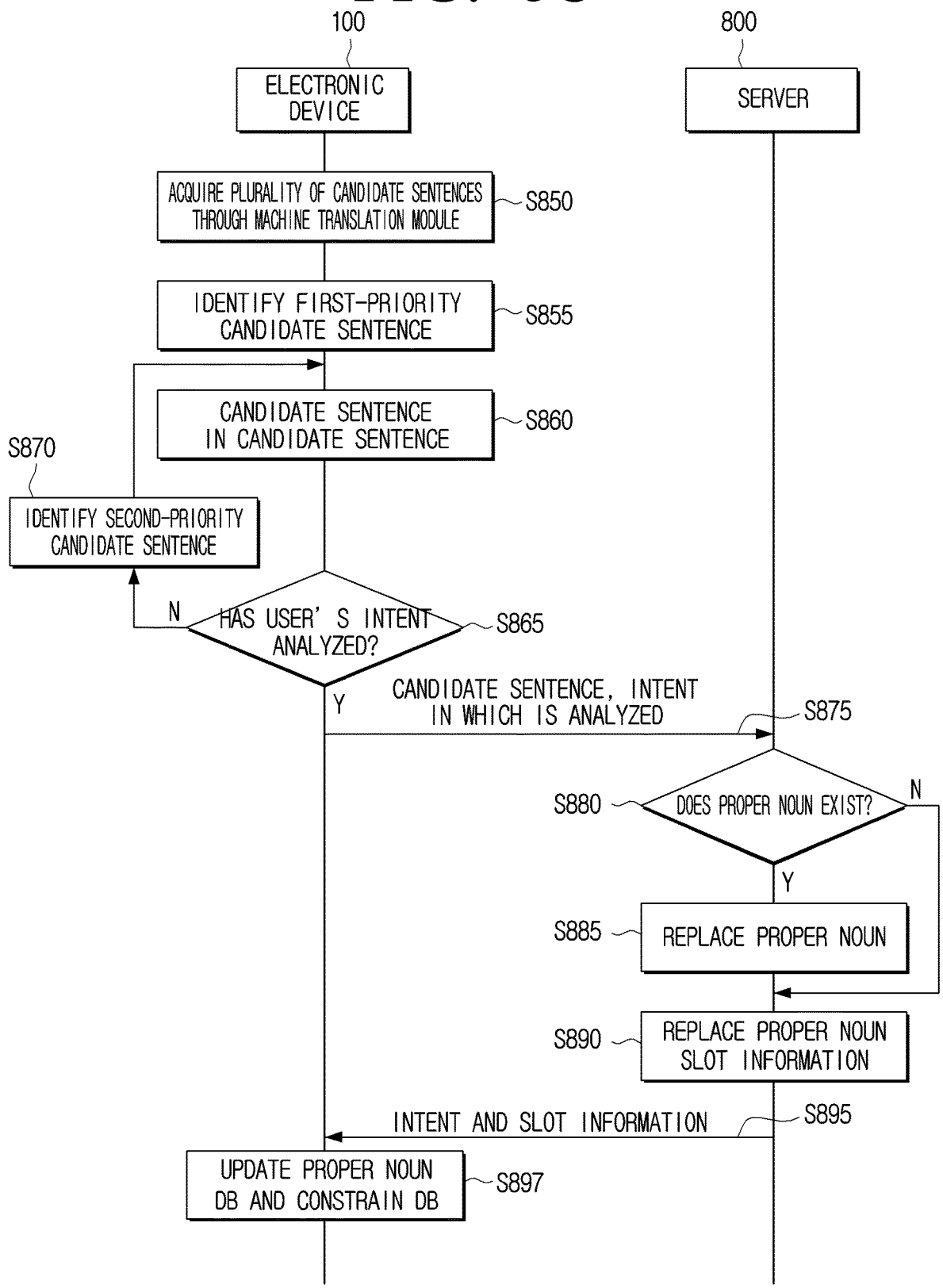
FIG. 8C is a sequence diagram for describing a method for performing natural language understanding regarding the plurality of candidate sentences in association with an external server according to an embodiment of the disclosure.

FIG. 8C is a sequence diagram for describing a method for performing natural language understanding regarding the plurality of candidate sentences in association with an external server according to an embodiment of the disclosure.

Referring to FIG. 8C, S850 to S870 are overlapped with S805 to S825 described in FIG. 8B, and therefore the detailed description will be omitted.

The electronic device 100 may transmit the candidate sentence, intent in which is analyzed, to a server 800 at operation S875.

The server 800 may identify (or, determine) whether or not a proper noun exists in the slot corresponding to the user's intent at operation S880. That is, the server 800 may identify (or, determine) whether or not the proper noun stored in the proper noun DB stored by the server 800 exists in the slot corresponding to the user's intent. The proper noun DB stored by the server 800 may store not only proper nouns in the domain related to services and functions provided by the electronic device 100, but also proper nouns in a domain other than the domain related to services and functions provided by the electronic device 100.

When the proper noun does not exist at operation S880-N, the server 800 may acquire the user's intent and the slot information of the candidate sentence, the intent in which is analyzed at operation S890. However, when the proper noun exists at operation S880-Y, the server 800 may replace the proper noun included in the slot based on the proper noun DB stored in the server 800 at operation S885, and acquire the user's intent and the slot information regarding the candidate sentence based on the replaced slot at operation S890.

The server 800 may transmit the user's intent and the slot information to the electronic device 100 at operation S895, and the electronic device 100 may update the proper noun DB 440 and the constrain DB 370 based on the replaced result of the proper noun at operation S897.

Figure 9:
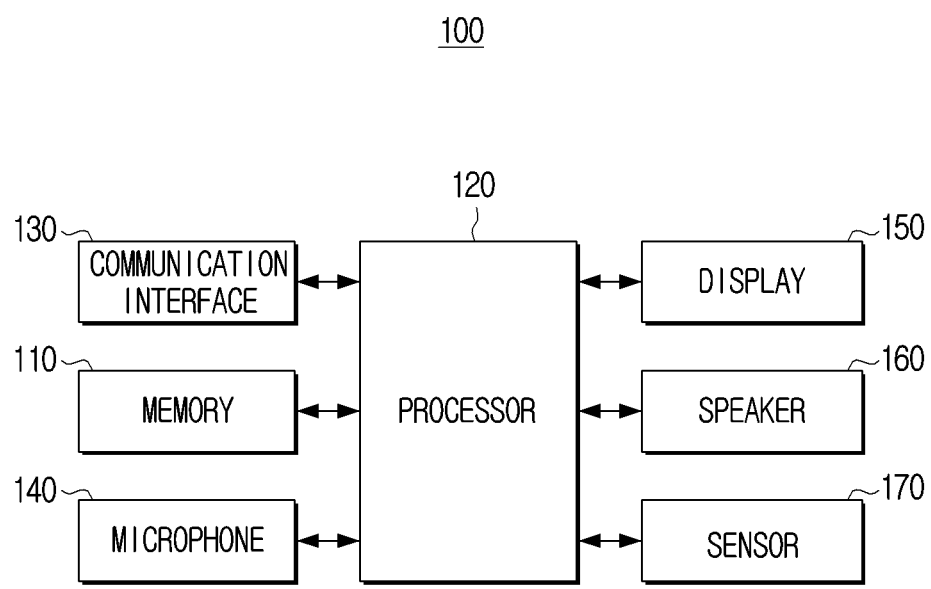
FIG. 9 is a block diagram showing components of an electronic device according to an embodiment of the disclosure.

FIG. 9 is a block diagram showing components of an electronic device according to an embodiment of the disclosure.

Referring to FIG. 9, the electronic device 100 may include the communication interface 130, the memory 110, a microphone 140, a display 150, a speaker 160, a sensor 170, and the processor 120. The components of the electronic device 100 shown in FIG. 9 may be partially added or omitted depending on the type of the electronic device 100.

The communication interface 130 is a component performing communication with various types of external devices according to various types of communication methods. The communication interface 130 may include a Wi-Fi module, a Bluetooth module, an infrared communication module, and a wireless communication module. Particularly, the processor 120 may perform the communication with various external devices by using the communication interface 130. The communication interface 130 may perform the communication with an external server for speech recognition, machine translation, and natural language understanding. That is, the communication interface 130 may transmit the user's speech in a speech data form to an external server for speech recognition, transmit the first sentence in the first language in a text data form to the external server for machine translation, and transmit the second sentence in the second language in a text data form to the external server for natural language understanding. In addition, the communication interface 130 may receive the first sentence in the first language as a result of the speech recognition, receive the second sentence in the second language as a result of the machine translation, and receive a control instruction, a response, user's intent, and information regarding slot as a result of the natural language understanding from the external server.

Figure 10:
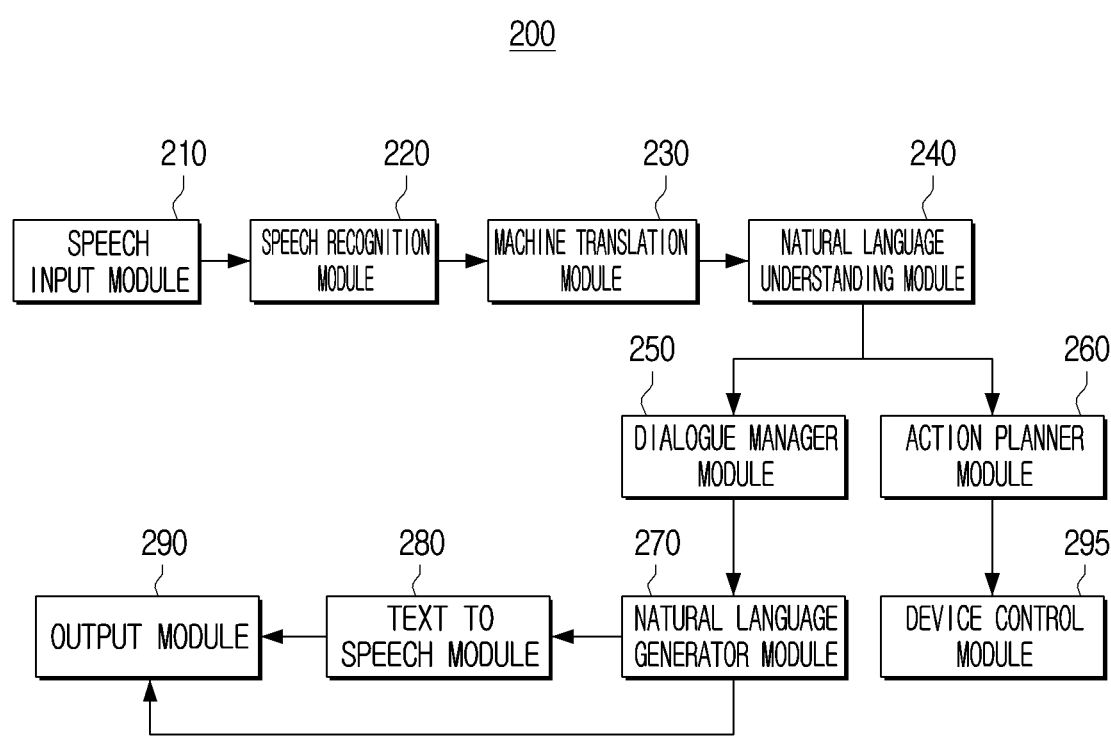
FIG. 10 is a block diagram showing components of a dialogue system of providing a response or acquiring a control instruction regarding a user's speech according to an embodiment of the disclosure.

The memory 110 may store an instruction or data related to at least one of other components of the electronic device 100. Particularly, the memory 110 may include a non-volatile memory and a volatile memory, and for example, may be implemented as a flash memory, a hard disk drive (HDD), or a solid-state drive (SSD). The memory 110 may be accessed by the processor 120 and reading, recording, editing, deleting, or updating of the data by the processor 120 may be executed. In addition, the memory 110 may store an artificial intelligence agent for operating the dialogue system. Specifically, the electronic device 100 may use an artificial intelligence agent for generating a natural language or acquiring a control instruction in response to utterance of a user. The artificial intelligence agent is a dedicated program for providing artificial intelligence (AI)-based service (for example, a speech recognition service, an assistant service, a translation service, a search service, and the like). In particular, the artificial intelligence agent may be executed by an existing general-purpose processor (for example, central processing unit (CPU)) or a separate AI-dedicated processor (for example, a graphics processing unit (GPU), a network processing unit (NPU), and the like). In addition, the memory 110 may include a plurality of components (or modules) constituting the dialogue system as shown in FIG. 10.

The microphone 140 may be a component for receiving a speech of a user and may be provided in the electronic device 100, but this is merely an embodiment, and the microphone 140 may be connected to the electronic device 100 in a wired or wireless manner from the outside of the electronic device 100. In particular, the microphone 140 may receive user's speech for controlling the electronic device 100 or external devices around the electronic device 100.

The display 150 may display an image received from outside or a UI. Particularly, the display 150 may be implemented as displays in various forms such as a liquid crystal display (LCD), an organic light emitting diodes (OLED) display, a plasma display panel (PDP), and the like. The display 150 may include a driving circuit that may be implemented in a form of an a-si thin film transistor (TFT), a low temperature poly silicon (LTPS) TFT, an organic TFT (OTFT), and a backlight unit. The display 150 may be implemented as a touch screen combined with a touch sensor, a flexible display, or a 3D display. In addition, according to an embodiment of the disclosure, the display 150 may include not only a display panel outputting an image, but also a bezel housing the display panel. Particularly, according to an embodiment of the disclosure, the bezel may include a touch sensor (not shown) for detecting user interactions. Particularly, the display 150 may provide a response result of the user's speech in a text or image form.

The speaker 160 may be a component outputting not only various audio data pieces received, but also various alarm tones or speech messages to outside. The electronic device 100 may include an audio output device such as the speaker 160, but may include an output device such as an audio output terminal. Particularly, the speaker 160 may provide a response result and an operation result of the user's speech in a speech form.

The sensor 170 may acquire various pieces of information related to the electronic device 100. Particularly, the sensor 170 may include a GPS which is able to acquire position information of the electronic device 100, and may include various sensors such as a biosensor for acquiring bio-information of a user using the electronic device 100 (for example, a heart rate sensor, a PPG sensor, and the like), and a motion sensor for detecting a motion of the electronic device 100.

In addition, the electronic device 100 may include an input interface receiving a user instruction for controlling the electronic device 100. The input interface may be implemented as a device such as a button, a touch pad, a mouse, or a keyboard, or may be implemented as a touch screen that is able to perform the display function described above and a manipulation input function. The button may be various types of buttons such as a mechanical button, a touch pad, or a wheel formed in any region of a front portion, a side portion, or a rear portion of the appearance of the main body.

The processor 120 may be electrically connected to the memory 110 and control general operations of the electronic device 100. Particularly, when the user's speech is input, the processor 120 may acquire the first sentence in the first language corresponding to the user's speech through the speech recognition model corresponding to the language of the user's speech, by executing at least one instruction stored in the memory 110. The processor 120 may acquire the second sentence in the second language corresponding to the first sentence in the first language through the machine translation model trained to translate a plurality of languages into the second language. The processor 120 may acquire a control instruction of the electronic device 100 corresponding to the acquired second sentence or acquire a response corresponding to the second sentence through the natural language understanding model trained based on the second language.

Particularly, the processor 120 may perform the natural language understanding in association with the external server based on the second sentence in the second language and the reliability value of the second sentence acquired by the machine translation model. Specifically, the processor 120 may acquire the second sentence and the reliability value of the second sentence by inputting the first sentence to a first machine translation model stored in the memory 110. If the reliability value is a threshold value or higher, the processor 120 may acquire a control instruction corresponding to the second sentence or acquire a response corresponding to the second sentence by inputting the second sentence to the first natural language understanding model stored in the memory 110.

In an embodiment, if the reliability value is lower than a threshold value, the processor 120 may transmit the first sentence to the external server storing a second machine translation model via the communication interface. The second machine translation model is a machine translation model trained with a larger amount of data (e.g., corpora) than the first machine translation model, and may perform more accurate machine translation than the first machine translation model. When the third sentence in the second language acquired through the second machine translation model is received from the external server via the communication interface, the processor 120 may acquire a control instruction corresponding to the third sentence or acquire a response to the third sentence by inputting the received third sentence to the first natural language understanding model. The first machine translation model may be retrained based on the first sentence and the third sentence.

In another example, if the reliability value is lower than a threshold value, the processor 120 may transmit the first sentence to the external server including the second machine translation model and a second natural language understanding model via the communication interface. The second natural language understanding model may be a natural language understanding model having more improved accuracy and processing speed, compared to the first natural language understanding model. The processor 120 may receive a control instruction corresponding to the third sentence or a response to the third sentence acquired through the second machine translation model and the second natural language understanding model from the external server via the communication interface.

In addition, the processor 120 may acquire a plurality of candidate sentences corresponding to the first sentence and reliability values corresponding to the plurality of candidate sentences through the machine translation model stored in the memory 110. The processor 120 may identify (or, determine) the intent in the first-priority sentence by inputting the first-priority sentence having a highest reliability value among the plurality of candidate sentences to the trained natural language understanding model. When the intent in the first-priority sentence is not identified (or, determined), the processor 120 may identify (or, determine) the intent in the second-priority sentence by inputting the second-priority sentence having a reliability value lower than that of the first-priority sentence among the plurality of candidate sentences to the trained natural language understanding model. When the intent in the second-priority sentence is identified (or, determined), the processor 120 may output a result (for example, the user's intent and slot) of the natural language understanding based on the second-priority sentence. The processor 120 may map at least one text included in the first sentence and at least one text included in the second-priority sentence as an input text and a correction text, and store these in a first database (or constrain DB) included in the machine translation module.

At least one text included in the first sentence and at least one text included in the second-priority sentence may be in the same language.

In addition, when the second sentence includes a proper noun stored in a second database related to the natural language understanding model, the processor 120 may replace at least one text included in the second sentence with the proper noun in the first language stored in the second database, and acquire a control instruction of the electronic device 100 corresponding to the replaced second sentence or a response to the second sentence. The processor 120 may map the at least one text and the replaced proper noun included in the second sentence as the input text and the correction text and store these in the first database. The at least one text and the replaced proper noun included in the second sentence may be in different languages.

In particular, functions related to the artificial intelligence according to the disclosure are operated through the processor 120 and the memory 110. The processor 120 may be composed of one or a plurality of processors. The one or the plurality of processors may be a general-purpose processor such as a CPU, an application processor (AP), or a digital signal processor (DSP), a graphic processor such as a GPU or a vision processing unit (VPU), or an artificial intelligence-dedicated processor such as an NPU. The one or the plurality of processors may perform control to process input data according to a predefined operation rule or an artificial intelligence model stored in the memory 110. If the one or the plurality of processors are the artificial intelligence-dedicated processor, the artificial intelligence-dedicated processor may be designed with a hardware structure specialized in processing of a specific artificial intelligence model.

The predefined operation rule or the artificial intelligence model is formed through training. The expression "formed through training" means that the predefined operation rule or the artificial intelligence model set to perform desired feature (or purpose) is formed by training a basic artificial intelligence model using a plurality of pieces of learning data by the learning algorithm. Such training may be performed in a machine itself performing functions of the artificial intelligence according to the disclosure or may be performed through a separate server and/or a system. Examples of the learning algorithm include supervised learning, unsupervised learning, semi-supervised learning, or reinforcement learning, but the learning algorithm is not limited to the above-mentioned examples.

The artificial intelligence model may be composed of a plurality of neural network layers. The plurality of neural network layers have a plurality of weight values, respectively, and perform neural network calculation through a calculation result of a previous layer and calculation between a plurality of weights. The plurality of weights of the plurality of neural network layers may be optimized by a training result of the artificial intelligence model. For example, the plurality of weighs may be updated to reduce or minimize a loss value or a cost value acquired by the artificial intelligence model during the training process. The artificial neural network may include a deep neural network (DNN), and examples thereof include a convolutional neural network (CNN), deep neural network (DNN), recurrent neural network (RNN), restricted Boltzmann machine (RBM), deep belief network (DBN), bidirectional recurrent deep neural network (BRDNN), or deep Q-networks, but there is no limitation to the above-mentioned examples.

FIG. 10 is a block diagram showing a dialogue system of an artificial intelligence agent according to an embodiment of the disclosure.

A dialogue system 200 shown in FIG. 10 is a component for having a dialogue with a virtual artificial intelligence agent in a natural language or controlling the electronic device 100. According to an embodiment of the disclosure, modules included in the dialogue system 200 may be stored in the memory 110 of the electronic device 100, but this is merely an embodiment, and the dialogue system may be implemented in a combined form of hardware and software. In addition, at least one module included in the dialogue system 200 may be included in at least one external server.

Referring to FIG. 10, the dialogue system 200 may include a speech input module 210, the speech recognition (SR) module 220, the machine translation (MT) module 230, the natural language understanding (NLU) module 240, a dialogue manager (DM) module 250, an action planner (AP) module 260, a natural language generator (NLG) module 270, a text to speech (TTS) module 280, an output module 290, and a device control module 295.

The speech input module 210 may receive a user's speech in a speech data form. The speech input module 210 may include a microphone, receive an audio signal in an analog form including a user's speech through the microphone, and convert the analog signal into a digital signal. In an embodiment, the speech input module 210 may acquire speech data corresponding to the user's speech by removing a noise component from the digital signal. However, according to another embodiment, the speech input module 210 may not remove any noise components, and the noise included in the digital signal may be removed through the speech recognition model in a subsequent process. Particularly, the user's speech received through the speech input module 210 may be in a form of a sentence or a phrase including at least one text, but this is merely an embodiment, and the user's speech may include a plurality of sentences or phases.

The microphone included in the speech input module 210 may be provided in the electronic device 100, but this is merely an embodiment, and the microphone may be provided outside and connected to the electronic device 100 in a wired or wireless manner. In addition, the speech input module 210 may include a communication module receiving the user's speech from an external device.

The speech recognition module 220 may convert the user's speech in a speech data form received from the speech input module 210 into text data. The text data may be data composed of character codes and the speech data may be data including frequency information regarding the user's speech. The speech recognition module 220 may include an acoustic model and a language model. The acoustic model may include information regarding utterance and the language model may include unit phoneme information and information regarding an assembly of pieces of the unit phoneme information. The speech recognition module may convert the user's speech into text data by using information regarding utterance and information regarding unit phoneme information. The information regarding the acoustic model and the language model may be stored in, for example, an automatic speech recognition database (ASR DB). Particularly, the speech recognition module 220 may include a plurality of language models and a plurality of acoustic models corresponding to a plurality of languages supported by the electronic device 100. For example, the speech recognition module 220 may include a first language model and a first acoustic model trained with a Korean corpus, a second language model and a second acoustic model trained with an English corpus, and a third language model and a third acoustic model trained with a Japanese corpus, but there is no limitation thereto.

In particular, the speech recognition module 220 may acquire a first sentence in a first language corresponding to the user's speech by using the acoustic model and the language model. The first sentence herein may include at least one text.

In addition, the speech recognition module 220 may identify the language of the user's speech through the language identification module 221 described in FIG. 2, and perform the speech recognition through the speech recognition model corresponding to the identified language of the user's speech.

The machine translation module 230 may acquire a second sentence in a predefined second language by translating the first sentence in the first language acquired through the speech recognition module 220. The machine translation module 230 may include a multilingual neural translation model. The machine translation module 230 has been described in FIGS. 3A and 3B, and therefore the overlapped description will be omitted.

The natural language understanding module 240 may grasp the domain and the user's intent in the user's speech by performing syntactic analysis or semantic analysis based on the second sentence in the second language. In the syntactic analysis, the user's speech may be divided into a syntactic unit (e.g., word, phase, or morpheme) and which syntactic element the divided unit has may be grasped. The semantic analysis may be performed by using semantic matching, rule matching, or formula matching. The natural language understanding module 230 has been described in FIG. 4, and therefore the overlapped description will be omitted.

The dialogue manager module 250 may provide a response to the user's speech based on the user's intent and the slot acquired through the natural language understanding module 240. The dialogue manager module 250 may provide a response to the user's speech based on a knowledge base. The knowledge base may be included in the electronic device 100, but this is merely an embodiment, and the knowledge base may be included in an external server.

In addition, the dialogue manager module 250 may identify (or, determine) whether or not the user's intent grasped by the natural language understanding module 240 is clear. For example, the dialogue manager module 250 may identify (or, determine) whether or not the user's intent is clear based on whether or not the information regarding the slot is sufficient. In addition, the dialogue manager module 250 may identify (or, determine) whether or not the slot grasped by the natural language understanding module 240 is sufficient to perform functions desired to be performed by a user. According to an embodiment, the dialogue manager module 250 may give a feedback requesting necessary information to a user, if the user's intent is not clear.

The natural language generator module 270 may change the designated information in a text form. The information changed into a text form may be in a form of a natural language. The designated information may be, for example, information regarding an additional input, information guiding completion of the operation corresponding to the user input, response information regarding a question, or information guiding an additional input of a user (e.g., feedback information regarding a user input). The information changed into a text form may be displayed on a display of the electronic device 100 or may be changed into a speech form by the text to speech module 280.

In addition, the natural language generator module 270 may have a configuration for machine translation. For example, when the natural language generator module 270 acquires a text in the second language, the natural language generator module 270 may acquire the text in the first language by translating the text in the second language into the text in the first language.

The text to speech module 280 may change information in a text form to information in a speech form. The text to speech module 280 may receive information in a text data form in the first language from the natural language generator module 270 and change information in a text data form to information in a speech data form.

The output module 290 may output information in a speech data form received from the text to speech module 280. The output module 290 may output the information in a speech data form through a speaker or a speech output terminal. Alternatively, the output module 290 may output the information in a text data form acquired through the natural language generator module 270 through a display or an image output terminal.

The action planner module 260 may generate at least one action rule (or path rule) by using the user's intent and the slot. For example, the action planner module 260 may generate at least one action rule by determining an application to be executed based on the user's intent and the slot and an operation to be executed in the application.

The action planner module 260 may identify (or, determine) an application to be executed based on the language of the user's speech input by the speech input module 210 or a current position of the electronic device 100. For example, if the language of the user's speech is Korean or the current position of the electronic device 100 is in Korea and the user's intent is to search, the action planner module 260 may identify (or, determine) a search application provided in Korea as the application to be executed, and if the language of the user's speech is Japanese or the current position of the electronic device is in Japan and the user's intent is to search, the action planner module 260 may identify (or, determine) a search application provided in Japan as the application to be executed.

The device control module 295 may control a device according to at least one action rule generated by the action planner module 260. For example, the device control module 295 may execute an application corresponding to the user's intent based on the at least one action rule and execute a control operation corresponding to the action included in the slot.

In the embodiment described above, it is described that the electronic device 100 includes the speech recognition module, the machine translation module, and the natural language understanding module therein, but this is merely an embodiment, and at least one of the speech recognition module, the machine translation module, and the natural language understanding module may be provided in an external server. In an example, the speech recognition module and the machine translation module may be provided in the electronic device 100 and the natural language understanding module may be provided in a server.

FIG. 11 is a sequence diagram for describing an embodiment of acquiring a control instruction regarding a user's speech in association with an external server according to an embodiment of the disclosure.

Referring to FIG. 11, operations S1110 to S1130 are identical to operations S510 to S530 of FIG. 5, and therefore the overlapped description will be omitted.

The electronic device 100 may transmit the second sentence in the second language to a server 1100 at operation S1140.

The server 1100 may acquire a control instruction of the electronic device 100 corresponding to the second sentence or a response to the second sentence acquired through the natural language understanding model at operation S1150. That is, the server 1100 identifies (or, determines) the user's intent and the slot corresponding to the second sentence through the natural language understanding model having natural language understanding ability of a larger domain than the natural language understanding model stored in the electronic device 100, and acquire a control instruction or a response based on the identified (or, determined) user's intent and the slot.

The server 1100 may transmit the acquired control instruction or response to the electronic device 100 at operation S1160. In addition, according to another embodiment, the server 1100 may not transmit the control instruction or the response, but transmit the user's intent corresponding to the second sentence and information regarding the slot.

The electronic device 100 may perform an operation based on the control instruction received from the server 1100 or output the response at operation S1170.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine herein is an apparatus which invokes instructions stored in the storage medium and is operated according to the invoked instructions, and may include an electronic device (e.g., electronic device 100) according to the disclosed embodiments. In a case where the instruction is executed by a processor, the processor may execute a function corresponding to the instruction directly or using other elements under the control of the processor. The instruction may include a code generated by a compiler or executed by an interpreter. The machine-readable storage medium may be provided in a form of a non-transitory storage medium. Here, the term "non-transitory" merely mean that the storage medium is tangible while not including signals, and it does not distinguish that data is semi-permanently or temporarily stored in the storage medium.

In an embodiment, the methods according to various embodiments of the disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM) or distributed online through an application store (e.g., PlayStore™). In a case of the on-line distribution, at least a part of the computer program product (for example, a downloadable application) may be temporarily stored or temporarily generated at least in a storage medium such as a memory of a server of a manufacturer, a server of an application store, or a relay server.

Each of the elements (for example, a module or a program) according to various embodiments may be composed of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory storing at least one instruction; and a processor, operatively coupled to the memory, and configured to control the electronic device by executing the at least one instruction stored in the memory,
wherein the processor is configured by the at least one instruction to:
based on a user's speech being input, acquire a first sentence in a first language corresponding to the user's speech through a speech recognition model corresponding to a language of the user's speech,
acquire a plurality of candidate sentences corresponding to the first sentence and reliability values corresponding to the plurality of candidate sentences through a machine translation model,
determine whether intent in a first-priority sentence is identified by inputting the first-priority sentence having a highest reliability value among the plurality of candidate sentences to the natural language understanding model trained based on a second language,
and based on determining that the intent in the first-priority sentence is not identified, determine whether intent in a second-priority sentence is identified by inputting the second-priority sentence having a reliability value lower than the reliability value of the first-priority sentence among the plurality of candidate sentences to the natural language understanding model trained based on the second language.

2. The electronic device according to claim 1,
wherein the memory comprises a first machine translation model and a first natural language understanding model,
wherein, to acquire the plurality of candidate sentences corresponding to the first sentence and reliability values corresponding to the plurality of candidate sentences, the processor is further configured by the at least one instruction to input the first sentence to the first machine translation model,
wherein the processor is further configured by the at least one instruction to acquire a reliability value of the second sentence in response to the input of the first sentence to the first machine translation model, and
wherein the processor is further configured by the at least one instruction to, based on the reliability value being a threshold value or higher, input the second sentence to the first natural language understanding model.

3. The electronic device according to claim 2, further comprising:
a communication interface configured to communicate with an external server, wherein the external server comprises a second machine translation model trained to translate a plurality of languages into the second language, and wherein the processor is further configured by the at least one instruction to:

based on the reliability value being lower than the threshold value, control the communication interface to transmit the first sentence to the external server, and based on a third sentence in the second language acquired through the second machine translation model being received from the external server, acquire a control instruction corresponding to the third sentence or acquire a response to the third sentence by inputting the third sentence to the first natural language understanding model.

4. The electronic device according to claim 3, wherein the first machine translation model is retrained based on the first sentence and the third sentence.

5. The electronic device according to claim 3, further comprising:

wherein the external server comprises a second natural language understanding model trained based on the second language, and wherein the processor is further configured by the at least one instruction to, based on the reliability value being lower than the threshold value:

control the communication interface to transmit the first sentence to the external server, and receive a control instruction corresponding to the third sentence or a response to the third sentence acquired through the second machine translation model and the second natural language understanding model from the external server via the communication interface.

6. The electronic device according to claim 1, further comprising:

a first database storing an input text and a correction text of the machine translation model which are mapped to each other, wherein the processor is further configured by the at least one instruction to, based on determining that the intent in the second-priority sentence is identified, map at least one text included in the first sentence and at least one text included in the second-priority sentence as the input text and the correction text in the first database.

7. The electronic device according to claim 6, further comprising:

a second database storing information regarding a proper noun stored in the electronic device, wherein the processor is further configured by the at least one instruction to, based on the second sentence including the proper noun stored in the second database:

replace at least one text included in the second sentence with the proper noun in the first language stored in the second database, and acquire a control instruction of the electronic device corresponding to the replaced at least one text included in the second sentence or acquiring a response to the second sentence.

8. The electronic device according to claim 7, wherein the processor is further configured by the at least one instruction to:

map the at least one text included in the second sentence and the proper noun as an input text and a correction text, and store the mapping of the at least one text included in the second sentence and the proper noun in the first database.

9. The electronic device according to claim 1, wherein the machine translation model is trained by performing multi-task learning (MTL) by using the second language as a common parameter.

10. A method for controlling an electronic device, the method comprising:

based on a user's speech being input, acquiring a first sentence in a first language corresponding to the user's speech through a speech recognition model corresponding to a language of the user's speech;

acquiring a plurality of candidate sentences corresponding to the first sentence and reliability values corresponding to the plurality of candidate sentences through a machine translation model;

determining whether intent in a first-priority sentence is identified by inputting the first-priority sentence having a highest reliability value among the plurality of candidate sentences to the natural language understanding model trained based on a second language: and based on determining that the intent in the first-priority sentence is not identified, determining whether intent in a second-priority sentence is identified by inputting the second priority sentence having a reliability value lower than the reliability value of the first priority sentence among the plurality of candidate sentences to the natural language understanding model trained based on the second language.

11. The method according to claim 10, wherein a memory of the electronic device comprises a first machine translation model and a first natural language understanding model, wherein the plurality of candidate sentences corresponding to the first sentence and reliability values corresponding to the plurality of candidate sentences comprises:

inputting the first sentence to the first machine translation model, wherein the method further comprises acquiring a reliability value of the second sentence in response to the inputting of the first sentence to the first machine translation model, and wherein the method further comprises:

based on the reliability value being a threshold value or higher, inputting the second sentence to the first natural language understanding model.

12. The method according to claim 11, wherein an external server connected to the electronic device comprises a second machine translation model trained to translate a plurality of languages into the second language, and wherein the method further comprises:

based on the reliability value being lower than the threshold value, transmitting the first sentence to the external server; and based on a third sentence in the second language acquired through the second machine translation model being received from the external server, acquiring a control instruction corresponding to the third sentence or acquiring a response to the third sentence by inputting the third sentence to the first natural language understanding model.

13. The method according to claim 12, further comprising:
   retraining the first machine translation model based on the first sentence and the third sentence.

14. The method according to claim 12,
   wherein an external server connected to the electronic device comprises a second natural language understanding model trained based on the second language, and
   wherein the acquiring of the control instruction or the acquiring of the response to the second sentence comprises, based on the reliability value being lower than a threshold value:
      transmitting the first sentence to an external server; and
      receiving a control instruction corresponding to the third sentence or a response to the third sentence acquired through the second machine translation model and the second natural language understanding model from the external server.

15. The method according to claim 10,
   wherein the electronic device comprises a first database storing an input text and a correction text of the machine translation model which are mapped to each other,
   wherein the method further comprises:
      based on determining that the intent in the second-priority sentence is identified, mapping at least one text included in the first sentence and at least one text included in the second-priority sentence as the input text and the correction text and storing in the first database.

16. The method according to claim 15,
   wherein the natural language understanding model comprises a second database storing information regarding a proper noun stored in the electronic device,
   wherein the acquiring of the control instruction or the acquiring of the response to the second sentence comprises, based on the second sentence including a proper noun stored in the second database:
      replacing at least one text included in the second sentence with the proper noun in the first language stored in the second database; and
      acquiring a control instruction of the electronic device corresponding to the replaced at least one text included in the second sentence or acquiring a response to the second sentence.

17. The method according to claim 16, further comprising:
   mapping the at least one text included in the second sentence and the proper noun as an input text and a correction text; and
   storing the mapping of the at least one text included in the second sentence and the proper noun in the first database.

18. The method according to claim 10,
   wherein the machine translation model is trained by performing multi-task learning (MTL) by using the second language as a common parameter.

* * * * *